United States Patent
Bezek et al.

(10) Patent No.: US 6,278,363 B1
(45) Date of Patent: Aug. 21, 2001

(54) METHOD AND SYSTEM FOR MONITORING AIR PRESSURE OF TIRES ON A VEHICLE

(75) Inventors: Craig A. Bezek, Palatine; Theodore V. Lester, Schiller Park; Donald J. Zito, Fox River Grove, all of IL (US)

(73) Assignee: Motorola, INC, Schaumburg, IL (US)

(*) Notice: Subject to any disclaimer, the term of this patent is extended or adjusted under 35 U.S.C. 154(b) by 0 days.

(21) Appl. No.: 09/616,421

(22) Filed: Jul. 14, 2000

(51) Int. Cl.$^7$ .................................................. B60C 23/00
(52) U.S. Cl. ..................... 340/442; 340/444; 340/445; 340/447; 73/146; 73/146.5
(58) Field of Search ..................... 340/626, 442, 340/444, 445, 447; 73/146, 146.2, 146.3, 146.5

(56) References Cited

U.S. PATENT DOCUMENTS

| | | |
|---|---|---|
| 4,319,220 | 3/1982 | Pappas et al. . |
| 5,109,213 | 4/1992 | Williams . |
| 5,335,540 | 8/1994 | Bowler et al. . |
| 5,483,827 | 1/1996 | Kulka et al. . |
| 5,600,301 | 2/1997 | Robinson, III . |
| 5,602,524 | 2/1997 | Mock et al. . |
| 5,774,047 | 6/1998 | Hensel, IV . |
| 5,838,229 | 11/1998 | Robinson, III . |

FOREIGN PATENT DOCUMENTS

| | | |
|---|---|---|
| 0 687 225 B1 | 3/1993 | (EP) . |
| 0 689 950 B1 | 5/1995 | (EP) . |

*Primary Examiner*—Julie Lieu
(74) *Attorney, Agent, or Firm*—Kenneth D. Labudda

(57) ABSTRACT

A method and system for monitoring air pressure or operational status of at least one particular tire of a vehicle facilitates ready identification of a relative mounting position of the particular tire. At least one pressure indicating signal is received (110 of FIG. 8) and is associated with a particular tire mounted at an unknown relative position on a vehicle. Physical parameter data are obtained (112) indicating physical parameter measurements at the different tires of a vehicle. The obtained physical parameter data are evaluated (114) to identify the relative mounting position of the particular tire on the vehicle. Accordingly, an operator of the vehicle may be provided with an indication (130) that an air pressure of a particular tire is less than a proper air pressure so that peak vehicle performance and necessary maintenance may be obtained. Even if the indication informs that the pressure is normal, the operator is reassured that the tires are functioning properly.

40 Claims, 14 Drawing Sheets

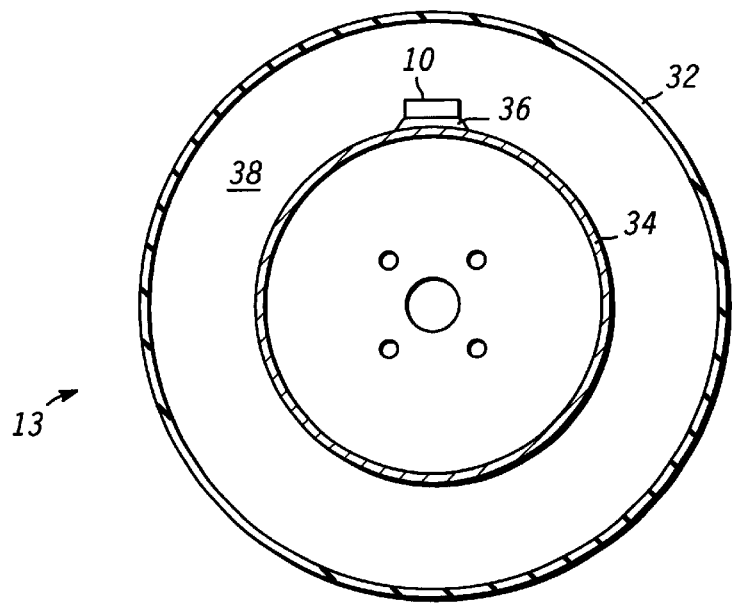
FIG. 2
FIG. 3
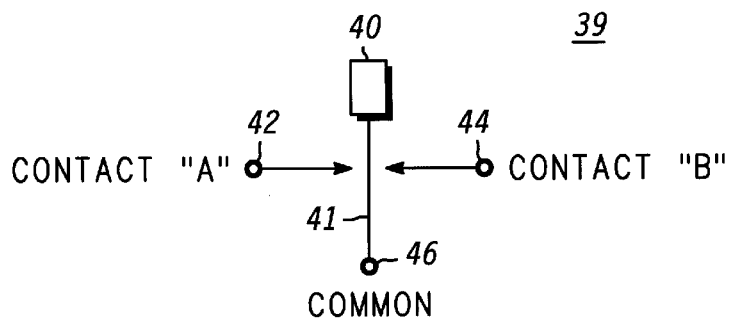
FIG. 4
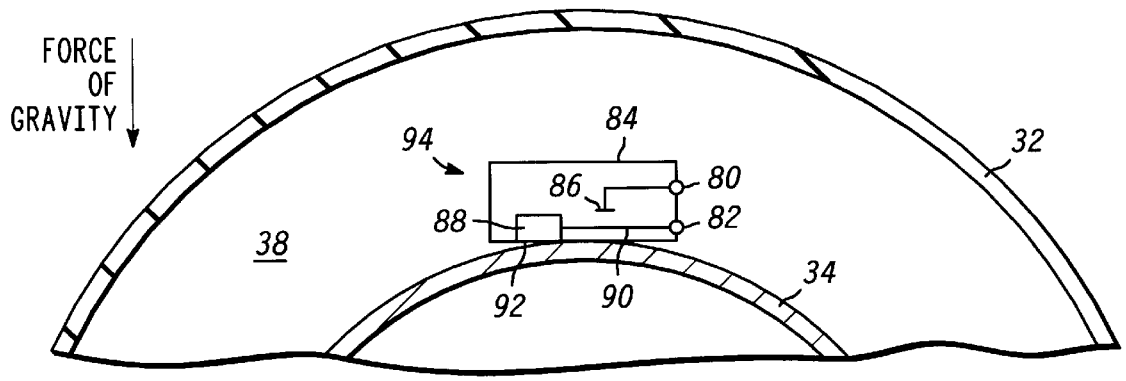

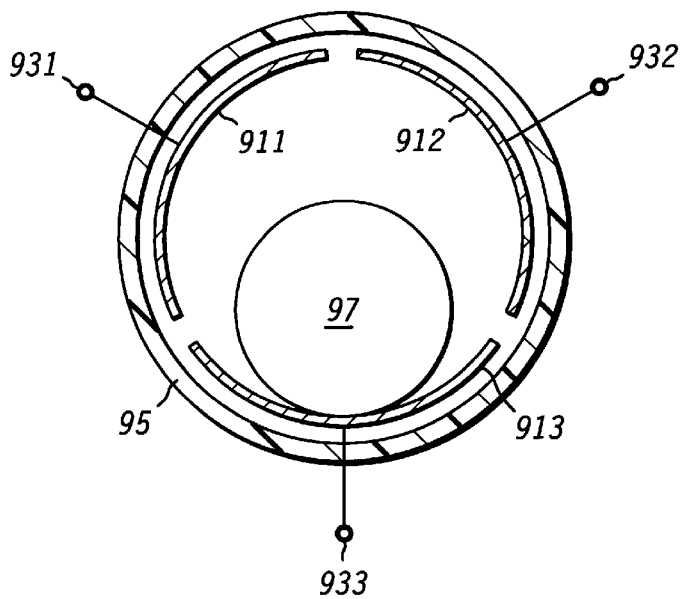

| RECEIVE MEASUREMENT DATA (E.G., PRESSURE DATA) FROM A MEASUREMENT SENSOR ASSOCIATED WITH AT LEAST ONE PARTICULAR TIRE OF THE TIRES OF A VEHICLE. THE PARTICULAR TIRE MAY HAVE AN UNKNOWN RELATIVE MOUNTING POSITION WITH RESPECT TO OTHER TIRES ON THE VEHICLE. |—110|
|---|---|

↓

| RECEIVE PHYSICAL PARAMETER DATA (E.G., INERTIAL DATA) FROM PHYSICAL PARAMETER SENSORS ASSOCIATED WITH THE VEHICLE OR THE DIFFERENT TIRES OF THE VEHICLE. |—112|
|---|---|

↓

| EVALUATE (E.G., COMPARE) THE RECEIVED PHYSICAL PARAMETER DATA TO IDENTIFY THE RELATIVE MOUNTING POSITION OF THE PARTICULAR TIRE ON THE VEHICLE. |—114|
|---|---|

↓

| INDICATE OPERATIONAL STATUS (E.G., INTERNAL AIR PRESSURE) OF THE PARTICULAR TIRE IN THE IDENTIFIED MOUNTING POSITION. |—130|
|---|---|

METHOD AND SYSTEM FOR MONITORING AIR PRESSURE OF TIRES ON A VEHICLE

FIELD OF THE INVENTION

This invention relates to a method and system for monitoring air pressure or operational status of at least one particular tire on a vehicle and identifying the relative mounting position of the particular tire on the vehicle.

BACKGROUND

Air pressure monitors are used to monitor the air pressure within conventional pneumatic tires to attain peak performance of the vehicle in terms of safety, optimum handling, and maximum gas mileage. If the vehicle operator is aware that a conventional tire has less than optimum air pressure the vehicle operator is more inclined to maintain the optimum or proper air pressure to maximize vehicle performance.

In the prior art, an air pressure monitor for monitoring the air pressure within pneumatic tires includes a pressure sensor and a wireless transmitter coupled to the pressure sensor. The wireless transmitter may transmit a unique identification code associated with each tire to identify the tire. In order to fully identify the relationship between the identification codes and the corresponding mounting positions of the tires, a person (e.g., a service technician) must manually enter or recalibrate the proper relationship at the time when the tires are mounted on their respective positions on the vehicle. Accordingly, if the tires are rotated, as is customary with ordinary vehicle service to provide uniform tread wear, the correspondence between the identification codes and the mounting positions must be recalibrated to identify the air pressure in the correct tires. Thus, a need exists for an air pressure monitor that automatically updates the identification code associated with each tire after mounting the tire or rotating the tire.

During the last decade, advances have been made in the construction of tires. For example, run-flat tires have become a relatively commonplace feature for luxury automobiles. A run-flat tire is capable of operation when air pressure is low or substantially reduced because of the puncture or another fault in the tire. Run-flat tires allow a vehicle to be driven a moderate distance such that a vehicle operator can seek repair of a defective tire with greater convenience than otherwise possible. The use of run-flat tires may also facilitate size reduction in vehicles because the spare tire may be eliminated if a vehicle is equipped with run-flat tires.

A vehicle operator may be unaware that a run-flat tire has lost its air pressure from visual inspection because of the construction of the run-flat tire. The run-flat tire generally handles adequately and is greatly superior in handling characteristics in comparison to a conventional flat tire that has lost air pressure. However, a vehicle operator may be unaware in the deterioration of the handling characteristics of a vehicle due to the loss of air pressure in the run-flat tire. Thus, there is a need for an air pressure monitor for monitoring the air pressure of run-flat tires to notify the driver of the lost air pressure so that the vehicle operator can seek appropriate maintenance and repair.

BRIEF DESCRIPTION OF THE DRAWINGS

FIG. 2 is a cross-sectional view of a wheel that shows one possible mounting position of a wheel electronics assembly of FIG. 1.

FIG. 3 is a schematic of one embodiment of a physical parameter sensor of FIG. 1.

FIG. 4, FIG. 5 and FIG. 6 illustrate another embodiment of a physical parameter sensor mounted within a wheel in accordance with the invention.

FIG. 7 illustrates another embodiment of a physical parameter sensor in accordance with the invention.

FIG. 8 is a flow chart of a method for monitoring the air pressure of different tires of the vehicle in accordance with the invention.

DETAILED DESCRIPTION OF PREFERRED EMBODIMENTS

In accordance with one embodiment of the invention, the method and system for monitoring air pressure or operational status of at least one tire of a vehicle may include receiving pressure data associated with at least one particular tire mounted at an unknown relative position on a vehicle. The unknown relative position represents one possible mounting position out of a group of possible mounting positions on the vehicle. Physical parameter data are obtained indicating physical parameter measurements for the vehicle or the different tires of the vehicle. The obtained physical parameter data are evaluated to identify the relative mounting position of the particular tire on the vehicle. Accordingly, an operator of the vehicle may be provided with an indication that an air pressure of the particular tire at the relative mounting position is less than a proper air pressure so that peak vehicle performance and necessary maintenance may be obtained.

Although the accompanying drawings and description describe the vehicle as including four tires for illustrative purposes, in other embodiments of the invention, the vehicle may include two or more tires. For example, the vehicle may comprise a passenger car with four tires, a motorcycle with a front and rear tire, a trailer with at least two rear tires, a truck with many sets of tires, or any other suitable vehicle configuration.

Figure 1:
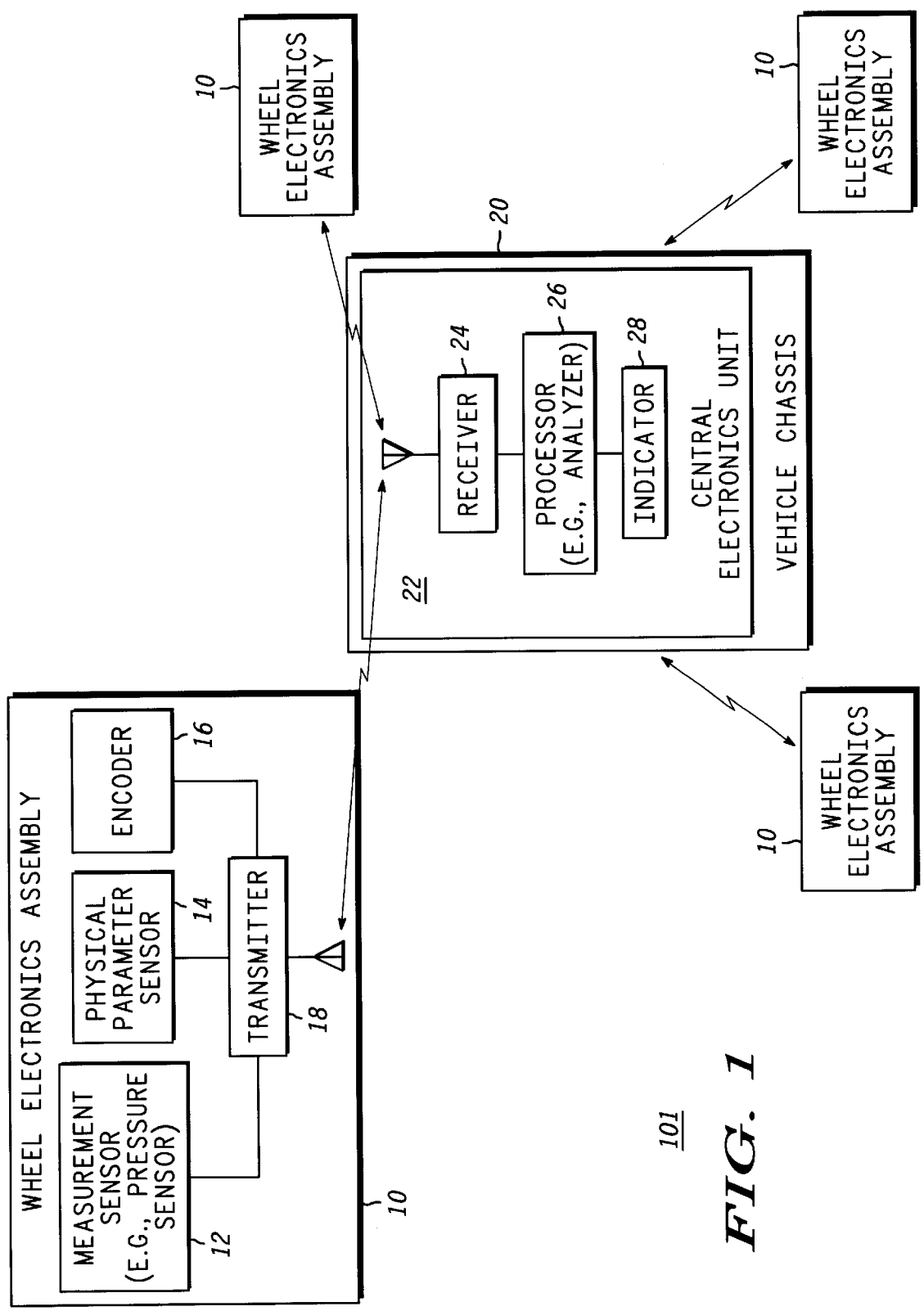
FIG. 1 is a block diagram of a system for monitoring air pressure of different tires of the vehicle in accordance with the invention.

In accordance with the invention, FIG. 1 illustrates a system 101 for monitoring air pressure of different tires of the vehicle. The system 101 includes wheel electronic assemblies 10 that communicate via electromagnetic signals with a central electronics unit 22. The central electronics unit 22 may be mounted on the vehicle chassis 20, within a dashboard of a passenger automobile, within a trunk, within an engine compartment, or elsewhere. Each wheel electronics assembly 10 is preferably mounted to a corresponding wheel in a manner suitable for monitoring the air pressure within a tire mounted on the wheel. As used herein, a wheel refers to a rim plus a pneumatic tire (e.g., conventional or run-flat tire) mounted on the rim.

The wheel electronics assembly 10 preferably includes a measurement sensor 12, a physical parameter sensor 14, and an encoder 16 coupled to a transmitter 18. The measurement sensor 12 represents a source of measurement data (e.g., pressure data) that indicates the internal air pressure or physical integrity of a corresponding tire. The physical parameter sensor 14 represents a source of information about the motion of a particular wheel on the vehicle. The encoder 16 may generate an identification code continuously, at regular intervals, or on command from logic circuitry associated with the wheel electronics assembly 10. The identification code may reduce the need for repeatedly identifying the mounting position of a tire through an analysis of physical parameter data by providing a reference to a previously identified mounting position of the tire.

The measurement sensor 12 may comprise a tire integrity sensor, a pressure sensor, or an indirect pressure sensor that senses an air pressure within the tire associated with a corresponding wheel. An indirect pressure sensor means a temperature sensor, a vibration sensor, or another indirect pressure sensor that indirectly senses air pressure within a tire. A temperature sensor or a vibration sensor may change an output state in a manner that is generally correlated to a transition from an adequately inflated tire to a deflated tire. For example, if a temperature sensor senses a tire temperature that exceeds a defined threshold temperature, the tire is likely to be flat or deflated. Similarly, if a road surface is in good repair and the vibration sensor senses a vibration level that exceeds a defined threshold vibration level, the tire may be flat, deflated, or damaged (e.g., loose recapping on retread tires).

The physical parameter sensor 14 may comprise an inertial sensor, an accelerometer, a lateral force detector, an accelerometer sensitive to lateral force, or any other sensor that provides physical parameter measurements useful for identifying a relative position of a particular tire on the vehicle. Each of the wheel electronics assemblies 10 preferably transmits an electromagnetic signal to the central electronics unit 22.

The central electronics unit 22 may include a receiver 24 coupled to a processor 26. The receiver 24 receives electromagnetic signals from the transmitters 18 of wheel electronics assemblies 10. The processor 26 establishes the relative mounting position of at least one particular tire on the vehicle based on an evaluation of the received electromagnetic signals. The processor 26 automatically calibrates or establishes the relative mounting positions of the tires on the vehicle without manual data entry after mounting or rotating tires on the vehicle. The recalibration procedure is triggered by a suitable triggering event, as later described herein.

The processor 26 may be coupled to an indicator 28. The indicator 28 is responsive to the processor 26 to alert a vehicle operator of pressure data for one particular tire or more tires. For example, the indicator 28 may provide a display or an alert of a relative mounting position for a corresponding flat, defective, or deflated tire.

In one alternate embodiment, if the central electronics unit 22 and each of the wheel assemblies 10 are equipped with two-way communications (e.g., a pair of transceivers, rather than transmitter 18 and receiver 24), the transceiver-equipped central electronics unit could poll the transceiver-equipped wheel assemblies for information to avoid interference among co-frequency transmissions from different wheel assemblies.

In another alternate embodiment, the encoder 16 is deleted from the wheel electronics assembly 10 and tire mounting positions are solely identified by analyzing measurement data, signal parameter data, or both of different wheel electronics assemblies 10 on an as-needed basis.

FIG. 2 illustrates a cross-sectional view of a tire 32 mounted on a rim 34 with a wheel electronics assembly 10 in accordance with the invention. FIG. 2 shows that the wheel electronics assembly 10 may be mounted to a rim 34 of the wheel 13 via an elastomer layer 36. However, in an alternate embodiment, the wheel electronics assembly may be mounted to the rim 34 via fasteners, or otherwise. The rim 34 may have a concave or a flat cross-section, which is bounded by a lip that engages the tire 32 in a manner that forms a generally hermetic seal between the tire 32 and the rim 34. The radial gap between the rim 34 and the outer circumference of the tire 32 defines a tire chamber 38, which has an internal air pressure if the tire 32 is inflated.

The wheel electronics assembly 10 is preferably resistant to shock and vibration where the wheel electronics assembly 10 is mounted on a rim 34 of a wheel. The wheel electronics assembly 10 normally rotates during operation of the vehicle and is exposed to bumps and other road imperfections that are transmitted to the suspension of the vehicle through the wheel. The wheel electronics assembly 10 is tolerant of temperature variations, present in the tire chamber 38 formed between the rim 34 and the tire 32.

Each wheel electronics assembly 10 affiliated with a corresponding wheel 13 preferably has a unique identification code. For example, a vehicle having four wheels preferably has four corresponding unique identification codes to at least uniquely identify each of the four tires. Prior to calibration by the processor 26, the identification codes do not identify the relative mounting positions of corresponding tires. After calibration by the processor 26, the unique identification codes identify the relative mounting positions of corresponding tires.

FIG. 3 is a schematic of an inertial rotational sensor 39 as a physical parameter sensor 14. The inertial rotational sensor 39 may comprise a mass 40 attached to a movable arm 41 that may pivot. The inertial rotational sensor 39 includes a first terminal 42, a second terminal 44 and a common terminal 46. The movable arm 41, the first terminal 42, the second terminal 44, and the common terminal 46 cooperate to form a switch. In response to movement of a wheel of the vehicle, the movement of the mass 40 activates the switch to achieve a change in a logical state during deceleration or acceleration of the vehicle. The mass 40 driving the switch may activate the switch to change switching states during angular deceleration (e.g., braking) of the vehicle.

A logic output or contact closure between the first terminal 42 and the common terminal 46 may indicate that the wheel is rotating in one direction, whereas a logic signal or contact closure between the second terminal 44 and the common terminal 46 may indicate that the wheel rotating in an opposite direction. If the inertial rotational sensor senses the rotational direction of the wheel in the above manner when the brake is applied, the inertial rotational sensor may be used to identify the wheel mounted on the left side of the vehicle from a wheel mounted on the right side of the vehicle. For example, the wheel mounted in the right side of the vehicle may provide a logic signal or a contact closure between the first terminal 42 and the common terminal 46, while the wheel mounted on the left side of the vehicle may provide a logic signal or a contact closure between the second terminal 44 and the common terminal 46.

While as few as one inertial rotational sensor per wheel may be used to practice the invention in an alternate embodiment, a differential inertial sensor provides additional redundancy and error checking to improve reliability of the monitoring system. In another alternate embodiment, the inertial sensor may comprise a piezoelectric member operably connected to a mass, an inductive system, a switch with three poles spaced about a round chamber containing a central, motion-responsive contact, or another mechanism for detecting rotation (e.g., magnetic field sensor that compares the orientation of a detected magnetic field to earth's magnetic field).

Figure 5:
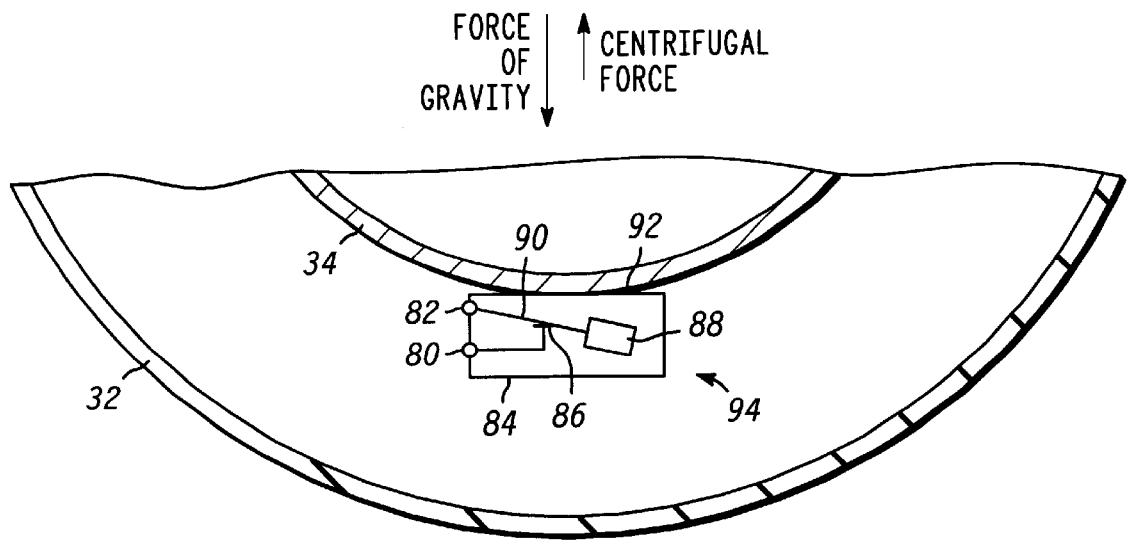
Figure 6:
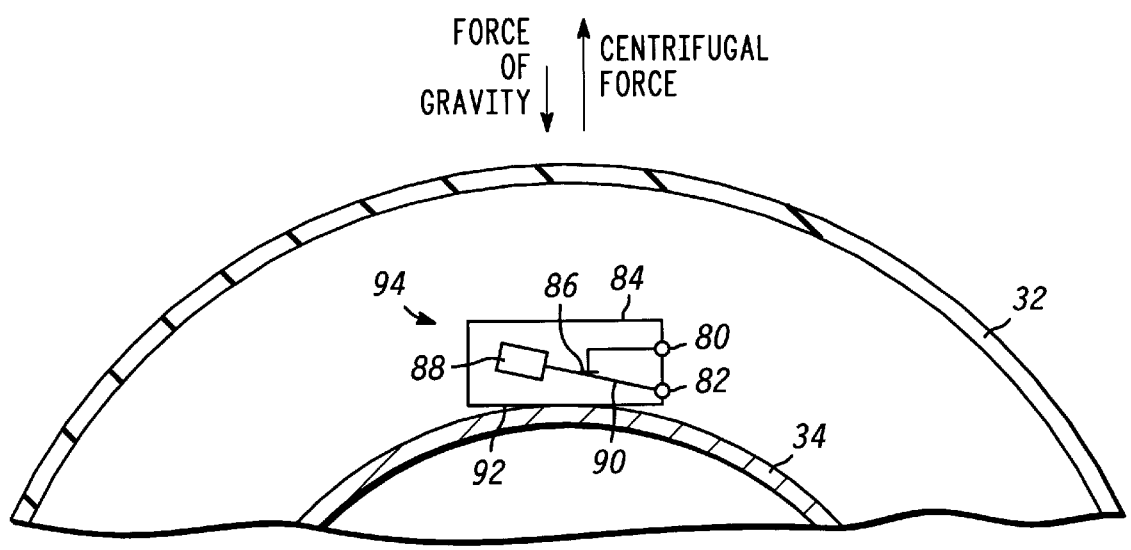

FIG. 4 through FIG. 6 show a sensing switch 94 as a physical parameter sensor 14 that is sensitive to gravity and centrifugal force. The sensing switch 94 is mechanically mounted to a rim 34 within a tire 32. A cross sectional view of the rim 34 and tire 32 is shown in FIG. 4 through FIG. 6. The sensing switch 94 includes a mass 88 connected to a conductive movable arm 90. A contact 86 is spaced apart from the conductive movable arm 90 in an open state and the contact electrically contacts the conductive arm 90 in a closed state. The sensing switch 94 is housed in a housing 84 and the housing 84 is electrically insulated from two terminals (80, 82) that extend from the conductive movable arm 90 and the contact 86. In FIG. 4 the sensing switch 94 is located at a top of the rim 34 in its cycle of rotation, as indicated by the arrow showing the direction of gravitational force. In contrast, in FIG. 5 the sensing switch 94 is located at a bottom of the rim 34 in its rotational cycle.

In FIGS. 4 and 5 the gravitational force exceeds a centrifugal force. However, in FIG. 6 the centrifugal force exceeds the gravitational force, as indicated by the relative lengths of the arrows. In FIG. 4, the gravitational force pulls the movable arm 90 downward such that the movable arm 90 may rest against a stop 92. A wall of the housing 84 may form the stop 92. In FIG. 5, the force of gravity predominates over the centrifugal force, as indicated by the relative lengths of the opposing arrows. Accordingly, the mass 88 is forced downward such that the conductible movable arm 90 mechanically contacts the contact 86 to complete an electrical connection. The contact 86 forms a stop for the conductive movable arm 90 as shown. In FIG. 6, the centrifugal force exceeds the gravitational force. Thus, the sensing switch 94 remains closed even when the sensing switch 94 is at the top of the rotational cycle of the wheel as shown.

FIGS. 4 and 5 apply at lower rotational velocity of the wheel, whereas FIG. 6 applies at greater rotational velocities of the wheel where centrifugal force exceeds the force of gravity. In other words, at rotational speeds of the wheel high enough for centrifugal force to overcome the gravitational force, the switch 94 is held in an closed state between the two terminals. At lower rotational speeds where the gravitational force predominates, the sensing switch 94 provides an oscillatory signal or oscillatory contact closure indicative of the rotational rate of a wheel in which the sensing switch 94 is mounted.

The processor 26 of the central electronics unit 22 determines the mounting position of each of the tires on the vehicle from the rotational speed of each wheel reported by the sensing switch 94 and by noting the turning direction of the vehicle. The location of the tires is determined because the outer tire on a turn rotates faster than an inner tire during the turn. In addition to performing the function of determining the relative locations of the tires of the vehicle, the sensing switch 94 of FIG. 4 through FIG. 6 may be used as a wake-up signal to activate the tire pressure monitoring system 101 in a manner that conserves electricity. When the sensing switch 94 initially provides an oscillatory output at low vehicle speeds, the wake-up feature may activate or latch a secondary switch in a closed state to apply electrical power to the circuitry of the wheel electronics assembly 10.

FIG. 7 shows another embodiment of a gravity switch 99 as a physical parameter sensor 14 that can be used to practice the present invention of monitoring vehicle tire pressure. The gravity switch 99 of FIG. 7 includes a conductive member 97 enclosed in a round housing 95. The round housing 95 is preferably a dielectric support that holds at least three conductive contacts (911, 912, and 913). The three conductive contacts (911, 912 and 913) are curved members (e.g., arcs that are slightly less than 120° degrees). The conductive member 97 may comprise a conductive disk, a conductive sphere, or a globule of mercury. The switch 99 is mounted within a tire so that as the tire rotates, the conductive member 97 also rotates. That is, the conductive member 97 rotates with respect to the contacts (911, 912 and 913) as the tire rotates. Accordingly, the conductive member 97 bridges the three conductive contacts (911, 912 and 913) in a sequence determined by the direction of rotation of the tire. For example, as shown in FIG. 7, if the wheel, associated with switch 99, turns in a clockwise direction, the switch 99 may experience contact closures in the following illustrative order: a first contact closure between terminals 933 and 931, a second contact closure between terminals 931 and 932, and a third contact closure between terminals 932 and 933. However, if the wheel is turning in the counter-clockwise direction, the switch 99 may experience a contact closure sequence in the following illustrative order: a first closure between terminals 933 and 932, a second closure between terminals 931 and 932; and a third closure between terminals 931 and 933. Accordingly, the sensing switch 99 of FIG. 7 obviates the need for an input of turning direction to central electronics unit 22 for detection of the wheel rotational direction in an alternate embodiment.

In an alternate embodiment, the number of conductive contacts may exceed three to define a switch closure sequence that identifies rotational direction. In another alternate embodiment, a combination of switches may be mounted within each tire of a vehicle. For example, the switch 94 of FIG. 4–FIG. 6 may be mounted in the same tire as the switch of FIG. 7 to provide the necessary information for identifying the mounting position of a tire on the vehicle. In yet another alternate embodiment, multiple switches may be wired together to generate a switch closure sequence, resembling that of the switch 99 of FIG. 7. Each of these individual switches may be in the form of the switch of FIG. 4 through FIG. 6. Further, each of these individual switches would be deployed at a different angular positions within a tire; preferably 120° degrees or less apart from each other to provide a unique sequence of switch closures that indicates rotational direction of the tire.

Returning to FIG. 1, each transmitter 18 may include an analog or digital multiplexer and a modulator for modulating an electromagnetic signal (e.g., radio frequency or microwave frequency signal) with a modulation signal. The multiplexer may multiplex the pressure data, the physical parameter data, and the identification code data of a wheel electronics assembly 10 to form modulation data carried as the modulation signal. The physical parameter data, the pressure data and the identifier codes may be expressed as one or more digital or analog signals. If necessary, the physical parameter data, the pressure data, and the identification codes may be digitized by an analog-to-digital converter prior to application to the processor 26. For example, an analog-to-digital converter may be coupled to an output of an analog multiplexer and an input of the modulator.

The transmitters 18 may use a contention scheme to promote efficient and reliable communications of the electromagnetic signals between the transmitters 18 and the receiver 24. The transmitter 18 on each wheel may be configured to transmit at an offset time with respect to each other to avoid data collisions and corruption of data that might occur if data is simultaneously transmitted from two or more wheel electronics assemblies 10 at once. Each of the transmitters 18 preferably radiates a low power signal with a suitable licensing scheme, which does not require licensing by applicable regulatory authorities.

In an alternative embodiment, each of the transmitters 18 may operate on offset frequencies, in accordance with a code-division multiple access-code scheme, or in a time division multiplex manner to avoid data collisions between data transmitted from different wheel electronics assemblies 10. Thus, the different frequencies, modulation codes, or time slots could provide inherent identification codes that replace the function of the encoder 16.

The processor 26 may comprise a data processor coupled to a storage device via a data bus. Thus, the processor 26 may comprise a computer or analyzer for evaluating the physical parameter data, the pressure data, and associated identification codes. Each identification code is preferably affiliated with a corresponding physical parameter data, a corresponding pressure data, or both. The processor 26 evaluates the physical parameter data and corresponding identification codes to identify a relative mounting position of a wheel assembly or tire with a corresponding pressure datum, without requiring manual entry of the relationship between identification codes and respective mounting positions of the tires on the vehicle. Accordingly, the central electronics unit 22 facilitates identifying a flat tire or a deflated tire that deviates from a desired air pressure in the tire, even after the tires on a vehicle have been rotated or remounted.

In accordance with one embodiment, the processor 26 sends information to the indicator 28 on the relative mounting position of a tire and the tire's air pressure. The indicator 28 may comprise a visual display (e.g., an alphanumeric liquid crystal display), a group of light-emitting diodes, an audible alarm, or any other suitable alerting device. The indicator 28 may indicate the air pressure of each tire on the vehicle along with the tire's relative position. Alternatively, the indicator 28 may merely indicate the position of a deflated tire or flat tire on the vehicle.

FIG. 8 illustrates a method for monitoring air pressure of different tires on a vehicle, which may be applied to the system of FIG. 1. Pressure data may be gathered when the vehicle is at rest or in motion. The alternator or generator of the vehicle is preferably providing electrical energy when such gathering occurs to prevent battery charge depletion by the central electronics unit 22. The pressure data may be expressed as analog information or digital information that is used to modulate an electromagnetic signal transmitted between the transmitter 18 and the receiver 24. The supplemental sensor data is preferably gathered when the vehicle is in motion.

In a preferred embodiment, a wheel electronics assembly 10 transmits an electromagnetic signal, modulated with pressure data and supplemental sensor data, to the central electronics unit 22 in the same transmission (e.g., during a continuous interval) or in the same message (e.g., a series of related, but temporally discontinuous packets). However, in an alternate embodiment, the wheel electronics assembly 10 may use other transmission schemes in which the pressure data and supplemental data are transmitted separately or in separate messages. Each wheel assembly 10 may be assigned a different transmit frequency or a different transmit code to avoid interference from simultaneous transmissions of different wheel assemblies 10 to the central electronics unit 22. Alternately, each wheel assembly 10 may be assigned a discrete transmit interval, a random transmit interval, or a unique time slot in accordance with cooperative timing among the wheel assemblies 10 to avoid simultaneous interfering transmissions from different wheel assemblies 10.

In step 110, the central electronics unit 22 receives pressure data associated with a particular tire at an unknown relative position among the different tires on the vehicle. The pressure data may represent the pressure signal, from the measurement sensor 12, that is transmitted over transmitter 18.

In step 112, the central electronics unit 22 obtains supplemental sensor data indicating physical parameter measurements at different tires of the vehicle. The physical parameter measurements may include measurements of inertia, the rotational direction, the combination of acceleration and lateral force, or any other physical parameter that may be used to identify and distinguish among different tires with regards to their relative mounting positions on the vehicle. The physical parameter measurements characterize the movement of the vehicle or the wheel electronics assemblies 10 during operation of the vehicle. The pressure data and the supplemental sensor data are preferably associated with an identification code that uniquely identifies a particular tire on the vehicle. However, the relative mounting position of the particular tire remains unknown until a calibration procedure has been completed.

In step 114 after step 112, the processor 26 compares the obtained supplemental sensor signals to each other to identify the relative mounting position of the particular tire. The supplemental sensor data may vary from tire to tire on the vehicle as the vehicle moves during normal operation. The processor 26 compares supplemental sensor signals with different identification codes for different tires. The processor 26 evaluates the variation in the supplemental sensor data with time and during certain vehicle maneuvers to identify the relative mounting position of the tires. For example, such vehicle maneuvers may include traveling in a relatively straight path while traversing road features (e.g., bumps), turning the vehicle, braking the vehicle, or otherwise.

In one embodiment, step 114 represents a calibration procedure. The calibration procedure assigns relative mounting positions of the tires to corresponding identification codes. Once calibration is completed, a wheel electronics assembly 10 may transmit an identification code along with a pressure sensor data to facilitate identification of a mounting position of a tire on the vehicle. Once the relative mounting position of the particular tire is known or re-calibrated in step 114, then the identification code may be used to identify the relative mounting position of the particular tire until the tires are rotated, until a reset switch is activated, or until another designated condition is satisfied. In another embodiment, if the pressure signal and the data signal are transmitted together in a monolithic message, the identification of the tire mounting positions can be done without the transmission of an identification code or the presence of an encoder 16 in the wheel electronics assembly 10.

During the comparison in step 114, the processor 26 may compare a first signal response (expressed as supplemental sensor data) associated with a first tire to a second signal response (expressed as supplemental sensor data) associated with the second tire to determine a relative mounting position of the first tire and the second tire of the vehicle.

In accordance with one example, during step 114 the processor 26 may compare a first signal response of a first inertial signal to a second signal response of a second inertial signal to sense rotational direction of the different tires. A physical parameter sensor 14 of one wheel electronics assembly 10 provides the first inertial signal. The physical parameter of another wheel electronics assembly 10 provides the second inertial signal. In accordance with another example, during step 114 the processor 26 may compare a first signal response of a first inertial signal to a second signal response of a second inertial signal to differentiate the left tire from a right tire of the vehicle.

In accordance with yet another example, during step 114 the processor 26 may compare a first signal response of a first pressure signal to a second similar response of a second pressure signal to distinguish a front tire from a rear tire of the vehicle. The measurement sensor 12 of a leading wheel electronics assembly 10 provides the first signal response. The pressure signal of a trailing wheel electronics assembly 10 provides a second similar response to the first signal response if the leading wheel electronics assembly 10 and the trailing wheel electronics assembly 10 traverse the same road feature within a certain limited time interval. Although more elaborate signal analysis techniques may be used to determined whether a first signal response and a second signal response are sufficiently similar, the first signal response and the second signal response may be considered sufficiently similar if the first signal response and the second signal response have signal amplitude peaks that fall within a certain defined range of each other. The first signal response and the second signal response may be considered substantially similar or identical if various signal parameter characteristics (e.g., shape of the an amplitude versus time response of the signals) approximately or exactly match one another.

Step 114 may further include processing an electrical signal indicative of an operational status of a transmission. The electrical signal may indicate or facilitate the determination of whether the vehicle is traveling in a forward direction or a reverse direction. The direction of vehicle travel may be used in conjunction with the timing of the first signal response and the second signal response to identify the relative mounting positions of the rear tire and the front tire.

Following step 114 in step 130, the indicator 28 may indicate to a vehicle operator a status of an internal air pressure of the particular tire in the identified mounting position. The status of the internal air pressure may include a low pressure status, a high pressure status, a deflated status, a flat status, or any other status that indicates that a particular tire requires maintenance or service. For example, the indicator 28 may alert a vehicle operator that a particular tire is partially deflated with respect to a desired target air pressure. The method of FIG. 8 may be used to monitor the pressure of one or more tires while identifying the relative mounting position of the tires on the vehicle, even if the tires on the vehicle are remounted or rotated prior to executing the method of FIG. 8.

The monitoring method and system of the invention is well-suited for conveniently apprising a vehicle operator of the status of tires from a cockpit or passenger compartment of the vehicle without visual inspection of the tires. The handling of the vehicle and tire longevity may be enhanced because the vehicle operator is readily informed of deficiencies in the internal air pressure within the identified tire or tires. A service technician or a vehicle operator does not need to manually recalibrate the relationship between identification codes and tire mounting positions, but may trigger the automatic update of the relationship between identification codes and tire mounting upon mounting or rotating tire mounting positions on the vehicle.

Figure 9:
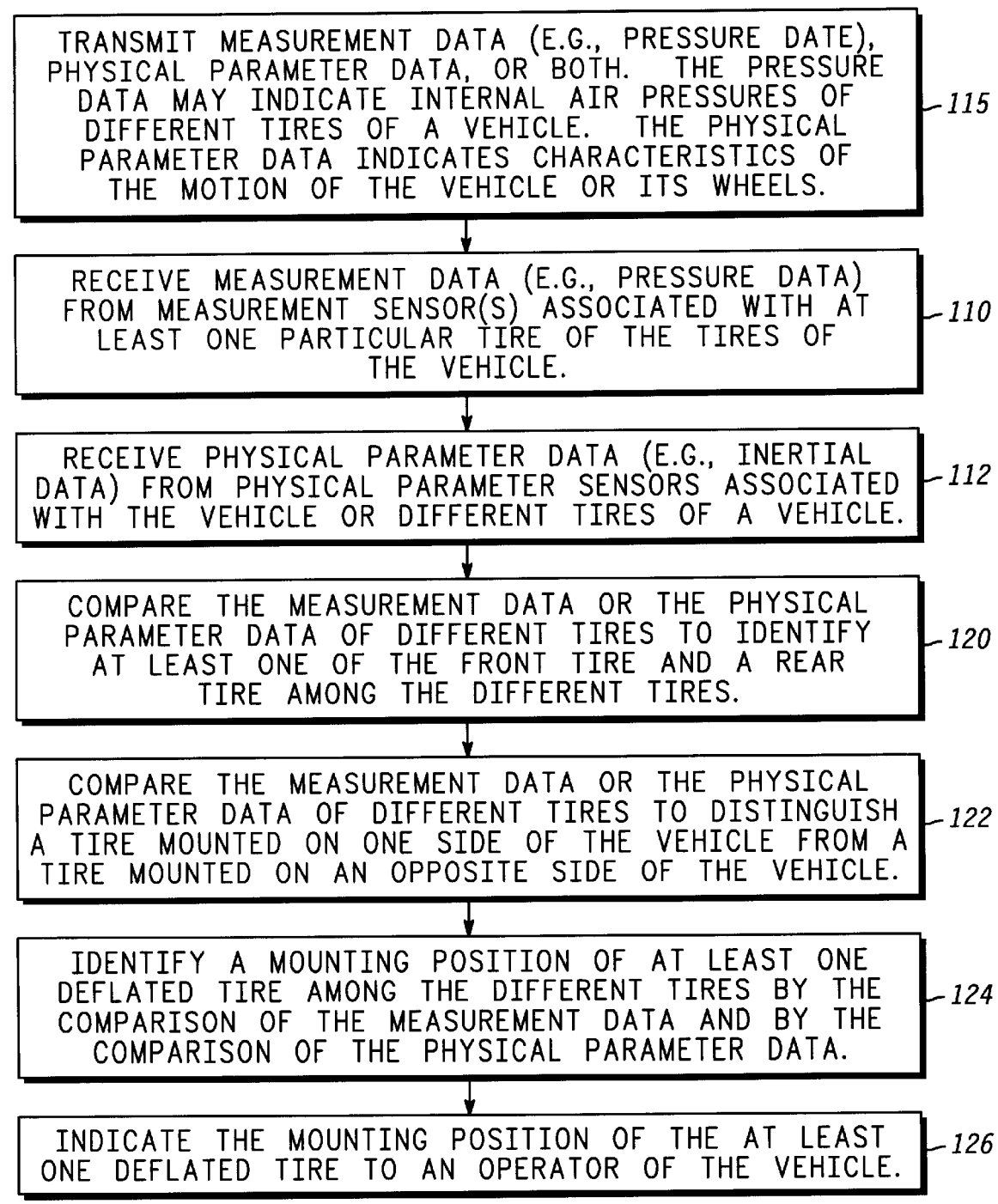
FIG. 9 is a flow chart of a method for monitoring the air pressure of different tires of the vehicle to identify a mounting position of at least one deflated tire in accordance with the invention.

In accordance with the invention, FIG. 9 represents an example of the method of FIG. 8 in greater detail. Like numbers in FIG. 8 and FIG. 9 indicate like steps. Similarly, steps 120, 122, and step 124 of FIG. 9 are consistent with step 114 of FIG. 8. Step 126 of FIG. 9 represents an example of step 130 of FIG. 8.

The method of FIG. 9 may be executed in response to one or more of the following calibration triggering events: (1) if the wheel electronics assembly 10 detects a tire pressure that falls outside of a desired range, the method of FIG. 9 is invoked; (2) if the vehicle starts a new trip indicated by motion of the vehicle after starting the vehicles engine, the method of FIG. 9 is invoked, (3) if a reset switch on a wheel electronics assembly 10 is activated after the tires on a vehicle are rotated in mounting position, the method of FIG. 9 is invoked, (4) if a distinct decrease in pressure followed by an increase in pressure is simultaneously sensed at multiple tires, the method of FIG. 9 is invoked. Where all of the tires of a vehicle are raised off the ground because a vehicle is placed on a rack (e.g., hydraulic lift) for servicing, the air pressure in the tires is first reduced when the vehicle is placed on the rack and then increased when the vehicle is placed on the ground. Such changes in air pressure from placing a vehicle on the rack do not necessarily indicate that the tire mounting positions have been changed, but recognize the possibility of the change in the tire mounting positions. After all, the vehicle must be raised in some manner to rotate the tires.

The method of FIG. 9 begins with step 115. In step 115, transmitters 18 transmit electromagnetic signals that carry measurement data (e.g., pressure data), physical parameter data, or both. The measurement data provides pressure data or tire integrity data of at least one tire of the vehicle. The pressure data may represent internal air pressure of different tires of a vehicle. The pressure data may be based on an unfiltered signal from the measurement sensor 12. The physical parameter data indicates different characteristics of motion of the vehicle or its wheels. The physical parameter data is based on a physical parameter signal provided by the physical parameter sensor 14 (e.g., inertial sensor).

An unfiltered signal from the measurement sensor 12 defines the signature of bumps, joint lines, road imperfections, and other road features. As the vehicle travels down the road over a single road feature, the measurement sensor 12 responds to substantially similar or identical transient changes in tire air pressure first at the front tires and subsequently at the rear tires.

The physical parameter sensor 14 may measure a physical parameter associated with the vehicle only for a period following the beginning of a trip of the vehicle or upon activation of a switch indicating that mounting of the wheels has changed. Accordingly, to conserve power at the electronic wheel assemblies 10, the transmitter 18 may suspend transmission of the physical parameter data, while merely transmitting the measurement data (e.g., pressure data) to the receiver 24.

In step 115, one transmitter 18 may first transmit a first pressure signal in response to the detection of a first road feature at a first tire and another transmitter 18 may secondly transmit a second pressure signal in response to the detection of the first road feature at a second tire. The first pressure signal and the second pressure signal may be expressed as pressure data or successive transmissions of pressure data. The first pressure signal is detected prior to the second pressure signal. The first road feature may represent a bump, a curve, a dip, a corner, a pot hole, or a transient change in elevation of the road.

The transmitters 18 of different wheel assemblies 10 may share the same transmission frequency or operate on different transmission frequencies in a manner consistent with avoiding interference among the different transmitters 18. For transmitters 18 sharing the same frequencies, the transmitters 18 may cooperate to inhibit the simultaneous transmission of the measurement data, physical parameter data, or both from two front tires or two rear tires for a vehicle. The prohibition of the simultaneous transmission prevents data collisions that might otherwise result when two front or two rear tires simultaneously traverse the same road feature. For example, a first pressure signal from one side of the vehicle may be transmitted to the receiver 24 upon detection of every other road feature that exceeds some minimum pressure threshold, whereas the second pressure signal from an opposite side of the vehicle may be transmitted to the receiver 24 upon the detection of every third road feature that exceeds some minimum pressure threshold.

In an alternate embodiment, the first pressure signal from one side of the vehicle and the second pressure signal from an opposite side of the vehicle may be transmitted at random times with respect to each other to avoid data collisions for co-frequency transmitters 18 of the wheel electronics assemblies. Similarly, a first physical parameter signal from one side of the vehicle and a second physical parameter signal from an opposite side of the vehicle may be transmitted at random times with respect to each other to avoid data collisions. Each wheel electronics assembly 10 may transmit pressure data via an electromagnetic signal from the transmitter 18 to the receiver 24 of the central electronic unit. The pressure data may be represented as analog or digital signals, although digital signals are preferred for application to the processor 26. Each wheel electronics assembly 10 may transmit an inertial signal via an electromagnetic signal from the transmitter 18 to the receiver 24.

In step 110 after step 115, the central electronic unit 22 receives measurement data (e.g., pressure data) from measurement sensors 12 associated with at least one particular tire different tires of the vehicle.

In step 112, a receiver 24 of the central electronics unit 22 may receive physical parameter signals (e.g., inertial signals) associated with the different tires of the vehicle. An inertial rotational sensor represents one example of a physical parameter sensor 14 of the central electronics unit 22.

The receiver 24 may provide a digital output signal to the processor 26 which includes measurement data (e.g., pressure sensor data), physical parameter data, and an identification code from demodulating the electromagnetic signal. The receiver 24 may detect a preamble upon initiation of the transmission (of the electromagnetic signal from each transmitter 18) followed by a transmission interval that contains the identification code for a wheel electronics assembly 10 and its associated pressure sensor data and physical parameter data.

For a vehicle with four wheels, the processor 26 operates in accordance with a first set of instructions for distinguishing a front wheel from a rear wheel in step 120 and a second set of instructions for distinguishing a left wheel from a right wheel in step 122. Although step 120 appears prior to step 122 in FIG. 9, steps 120 and 122 may be executed in any order or simultaneously.

Under the first set of instructions in accordance with step 120, the processor 26 compares the measurement data or physical parameter data for different tires to identify at least one front tire and a rear tire of the different tires. Step 120 may be executed in accordance with one of at least three alternate techniques, designated a first technique, a second technique, and a third technique for clarity.

Under a first technique for step 120, if the processor 26 determines that a road feature is detected at the first tire prior to the road feature being detected at the second tire, then the first tire is most likely the front tire and the second tire is most likely a rear tire of the vehicle. To identify the relative mounting position of the tires, a transmission-related output (e.g., an electrical signal) is used to determine a direction of travel of the vehicle while the vehicle traverses the road feature. The processor 26 compares a first signal response to a second signal response along with a time lapse between the first signal response of one pressure sensor and the second signal response of another pressure sensor to determine if the vehicle has traversed over a single road feature. For example, the processor 26 may represent an analyzer that is adapted to perform a statistical analysis of an amplitude versus time response of the first signal response and the second signal response. The first and second signal response may be expressed as pressure data. An output of a vehicle speedometer may be used to validate the time lapse between the first signal response and the second signal response because the distance between the tires is fixed.

After the detection of the sufficiently similar or identical transient changes of the first signal response and the second signal response within a predetermined time span based on the expected or measured velocity of the vehicle, the appropriate identification codes may be assigned to one or more front wheels and one or more rear wheels of the vehicle. The processor 26 assigns an identification code associated with a corresponding front mounting position of the tires based on the timing of the received pressure signals from different electronic wheel assemblies 10. Similarly, the processor 26 assigns the identification code associated with a corresponding rear mounting position of the tires based on the timing of the received pressure signals from different electronic wheel assemblies 10.

Under a second technique for step 120, the change in air pressure within the front tires and the rear tires during braking (e.g., hard braking) is compared to identify at least one front tire or a rear tire. Hard braking may be defined as a deceleration of the vehicle meeting or exceeding a minimum threshold deceleration. During braking (e.g., hard braking), the front tires are generally more heavily loaded than the rear tires. An increase in air pressure within the tire during braking indicates a front tire. A decrease in the air pressure within the tire during braking may indicate a rear tire. The increase in the air pressure during braking represents an increase from a measured air pressure in the same tire or a similarly situated tire when the vehicle is at rest or at another time prior to braking. Similarly, the decrease in the tire pressure during braking represents a decrease from a measured air pressure in the same tire or a similarly situated tire when the vehicle is at rest or at another time prior to braking. Thus, the processor 26 assigns the identification codes associated with a corresponding front mounting position or a corresponding rear mounting position of the tires based on the pressure changes measured at different electronic wheel assemblies during braking.

Under a third technique for step 120, an accelerometer is used as the physical parameter sensor 14 in each electronics wheel assembly 10 to distinguish a front tire from a rear tire. Because the front wheels are typically used to steer the vehicle, while the rear wheels follow the direction of the vehicle, the front wheels will experience higher lateral acceleration forces than the rear wheels when the car is turned. During normal driving, the car will negotiate turns. The monitoring system 101 could identify the front tires and the rear tires by measuring the lateral acceleration at different wheel electronics assemblies 10 during a turn of the vehicle. The processor 26 may first determine that the two wheels having the greatest lateral acceleration are the front tires; hence, the remaining tires are the rear tires by default. Conversely, the processor 26 may first determine that the two wheels having lowest lateral acceleration are the rear tires; hence, the remaining tires are the front tires by default.

The accelerometer may serve an added duty as a wake-up switch for the wheel electronics assembly 10 by controlling the flow of electrical energy from a power source to the wheel electronics assembly 10, in response to a change in acceleration of the vehicle from a rest state of the vehicle. The wheel electronics assembly 10 may be instructed to suspend transmitting of the transmitter 18 until lateral acceleration exceeds a minimum calibrated threshold to conserve energy consumption of the wheel electronics assembly 10 when the vehicle is at rest (e.g., parked).

In step 122, the processor 26 operates in accordance with the second set of instructions to distinguish a tire mounted on one side of the vehicle from a tire mounted on an opposite side of the vehicle. For example, one side of the vehicle may be a left side or driver's side for a U.S. automobile, while the opposite side of the vehicle may be a right side of the vehicle or a passenger side of the vehicle for an automobile. Step 122 may be executed in accordance with at least one of three alternate procedures, designated a first procedure, a second procedure, and a third procedure for clarity.

In accordance with a first procedure for step 122, the processor 26 compares the measurement data or physical parameter data (e.g., inertial signals) for different wheels. Here, the physical parameter sensor 14 may comprise an inertial switch, a rotation sensor, an accelerometer, or another suitable sensor. An accelerometer provides physical parameter data indicative of the direction of tire rotation when a vehicle accelerates after being at rest. The transmitter 18 may transmit the signal parameter data as few as one time per trip of the vehicle, as opposed to periodically throughout the trip of a vehicle, to facilitate power conservation during the identification of the mounting positions of the tires on the vehicle.

The processor 26 may analyze the physical parameter data to determine the direction of wheel rotation of various wheels on the vehicle. The processor 26 may use the inertial signals to determine the direction of wheel rotation at each wheel electronics assembly 10. The wheel electronics assembly 10 may provide an output indicating clockwise or counterclockwise rotational direction to the transmitter 18.

The processor 26 determines or processes a direction of forward travel of the vehicle. In one embodiment, the processor 26 may determine the direction of forward travel in the following manner. The processor 26 may statistically analyze inertial signals to distinguish between braking during forward movement of the vehicle and braking during the backing up of the vehicle. In the case of an automobile as a vehicle, the automobile travels forward more of the time than backward, so the predominant direction of travel may be assumed to define the forward direction.

In an alternate embodiment, the processor 26 determines the direction of forward movement by using an electrical signal representative of the operational status of the vehicle transmission or speedometer. Generally, a speedometer does not respond to backward movement of a vehicle and remains at the zero kilometer per hour position during backwards movement.

Once the direction of forward travel for the vehicle is established and once the direction of wheel rotation is known, the left mounting position versus the right mounting position may be determined.

Under a second procedure for executing step 122, the processor 26 may identify the left mounting position versus a right mounting position of a tire by measuring tire pressure changes during cornering of the vehicle. A physical parameter sensor 14 or another sensor for providing a direction in which a vehicle turns is required. For example, a body lean detector, a yaw rate detector, or a steering wheel positional sensor may be used to determine a turning direction of the vehicle. The body lean detector or yaw rate detector provides an output signal that indicates the direction of body lean. The direction of body lean generally varies with cornering of the vehicle and may indicate the direction in which the vehicle is turning.

During a turn of the vehicle, an outer tire pressure change exceeds an inner tire pressure change. An outer tire may experience an increase in the internal air pressure of the tire with respect to the internal air pressure of the same tire measured during a rest state of the vehicle. In contrast, an inner tire may experience a decrease in the internal air pressure of the tire with respect to the internal air pressure of the same tire measured during a rest state of the vehicle. Once the direction of the turn of the vehicle and the tire pressure changes are known, the processor 26 may distinguish a left tire from a right tire. For example, during a left turn, the processor 26 may determine that the tire with an increase in internal air pressure is the outer tire, which is the equivalent of the right tire. Conversely, during a left turn, the processor 26 may determine that the tire with a decrease in internal air pressure is the inner tire, which is the equivalent of the left tire.

In accordance with a third procedure for step 122, a signal parameter sensor comprises an accelerometer, a flip-flop switch, a three-pole gravity switch, or another rotational sensor that provides an output signal indicative of each time a tire makes a complete or partial rotation. The data on the rate of the tire rotation transmitted over the electromagnetic carrier depends upon rotational speed of each wheel. The outer tire will rotate more rapidly than the inner tire during a turn. A steering wheel positional indicator 28 or a turn signal connection may be used in conjunction with the rotational sensor (e.g., accelerometer) to distinguish a right side of a vehicle from a left side of the vehicle.

Following step 120 and step 122 in step 124, the processor 26 may identify a mounting position of at least one defective or deflated tire among the different tires. The comparison of the measurement data and a comparison of the physical parameter data from different wheels facilitates identification of the relative mounting position of a tire. In an illustrative embodiment where a vehicle has four tires, the tire mounting position may be expressed in terms of the following possible combinations: (1) the front left tire, (2) the front right tire, (3) the rear left tire, and (4) the rear right tire.

After step 124 in step 126, the indicator 28 may indicate that mounting position of at least one defective or deflated tire to an operator of the vehicle. For example, the indicator 28 may represent a display on a dashboard or an audible alarm within the cockpit of the vehicle so the vehicle operator may readily be apprised of the operational status of the tires during driving or at rest without leaving the cockpit of the vehicle.

Figure 10:
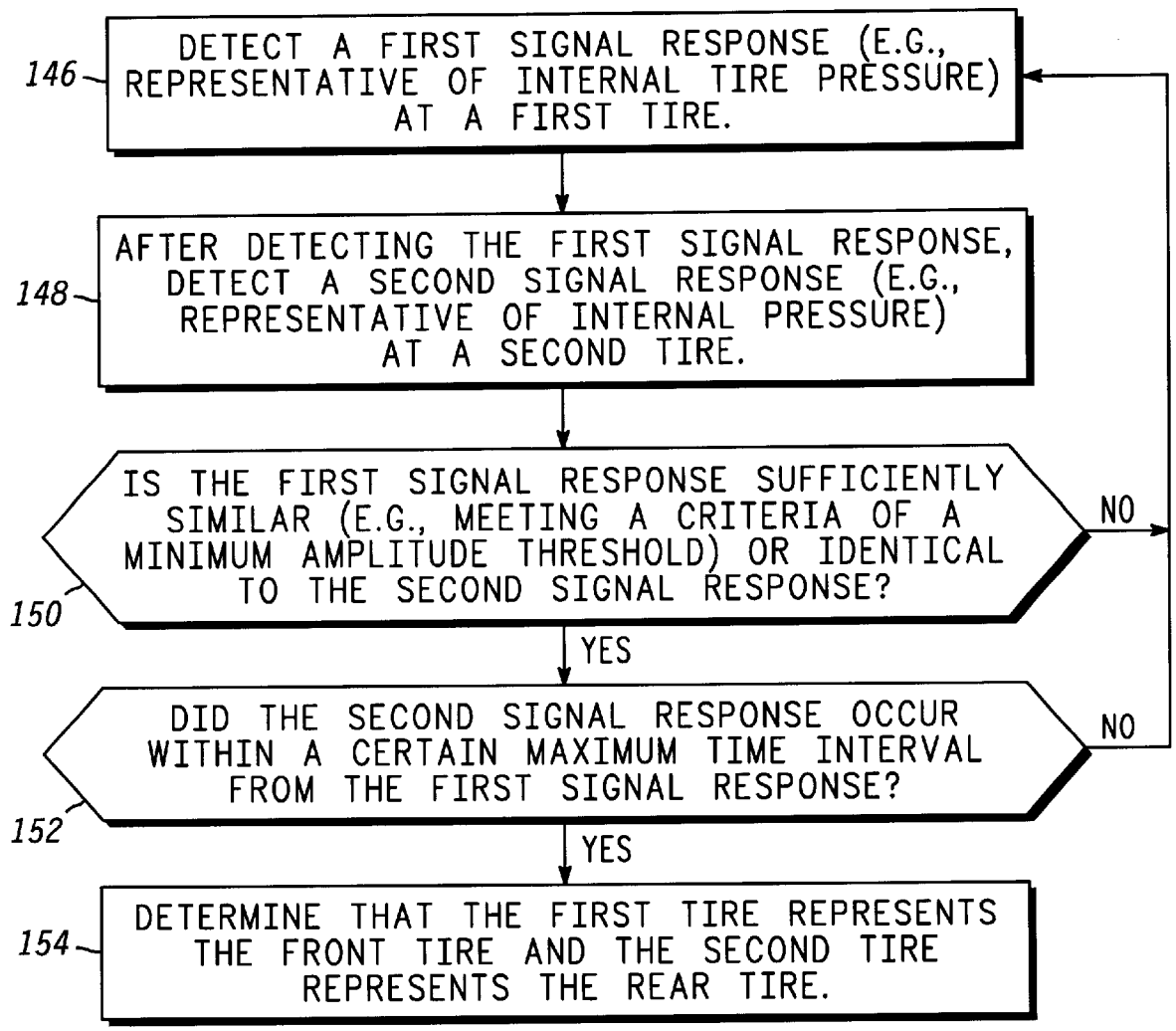
FIG. 10 through FIG. 14 are flow charts representing various techniques for distinguishing between a front tire and a rear tire of a vehicle in accordance with the invention.

FIG. 10 is a flow chart of the first technique for performing step 120 of FIG. 9. Following step 112 of FIG. 9, in step 146 a physical parameter sensor 14 or a measurement sensor 12 detects a first signal response, representative of an internal air pressure within a first tire. In step 148 after detection of the first signal response, another signal parameter sensor 14 or another measurement sensor 12 detects a second signal response, representative of an internal air pressure within a second tire. The transmitter 18 of the wheel electronics assembly 10 transmits information representing the first signal response and the second signal response to the central electronics unit 22 consistent with FIG. 9. For example, the first signal response and the second signal response may be transmitted in step 115 of FIG. 9 and the detection of step 146 may occur prior to step 115 of FIG. 9.

In step 150, the processor 26 of the central electronics unit 22 determines whether the first signal response is sufficiently similar to or substantially similar to the second signal response. For example, if a first peak amplitude of the first signal response and a second peak amplitude of a second signal response meet or exceed a minimum amplitude threshold, the processor 26 may determine that the first signal response is sufficiently similar to the second signal response. The minimum amplitude threshold may be selected empirically based on an evaluation of responses to various road features.

In an alternate embodiment, a more exacting approach might require general equivalency of one or more signal characteristics of the first signal response and the second signal response to prevent the occurrence of false determinations of equivalence between the first signal response and the second signal response. Such signal characteristics may include the shapes of the amplitude versus time responses of the first signal response and the second signal response, the slopes of generally linear rises of the amplitude versus time responses of the first signal response and the second signal response, or the slopes of generally linear falls of the amplitude versus time response of the first signal response and the second signal response.

If the processor 26 determined that the first signal response is sufficiently similar to the second signal response, the first technique continues with step 152. Otherwise, the first technique continues with step 146.

In step 152, the processor 26 determines if the second signal response occurred within a certain maximum time interval from the first signal response. The certain maximum time interval depends upon the speed of the vehicle and the fixed separation between a front wheel and a rear wheel of the vehicle. For example, as the speed of the vehicle is increased, the maximum time interval becomes shorter. If the processor 26 determined that the second signal response occurs within the maximum time interval from the first signal response consistent with the speed and vehicular dimensions between a front wheel and a rear wheel, the first technique continues with step 154. Otherwise, the first technique continues with step 146. In step 154, the processor determines that the first tire represents the front tire and the second tire represents the rear tire. After step 154, the method may continue with step 122 of FIG. 9.

Figure 11:
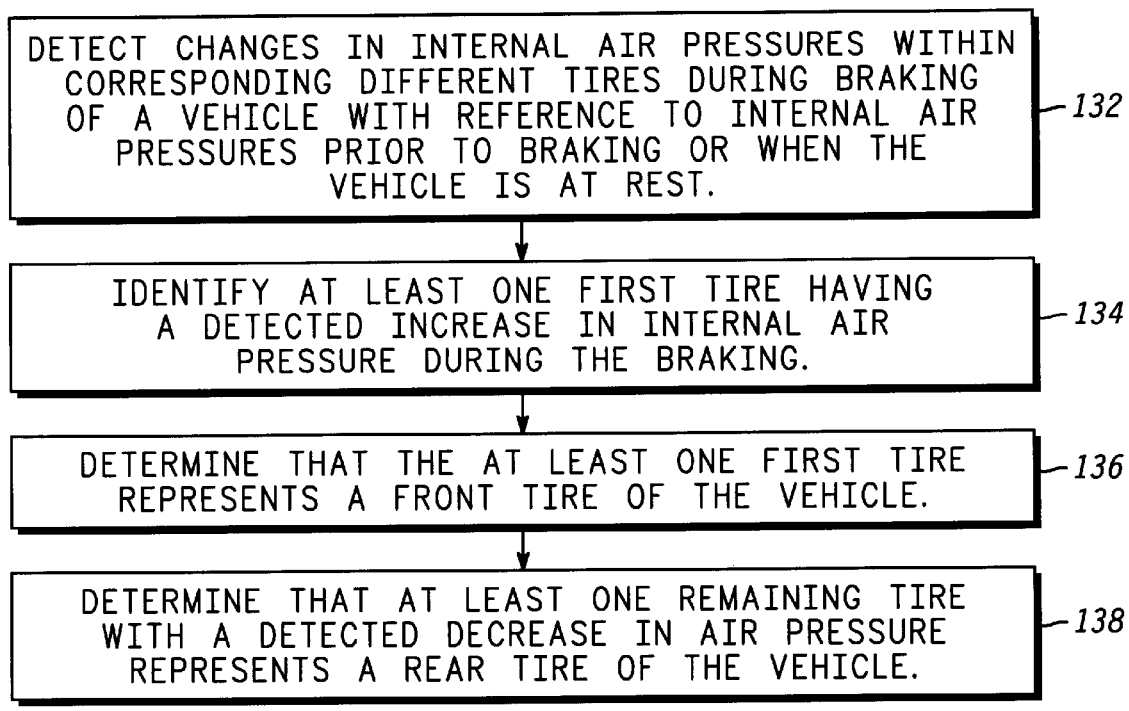
Figure 12:
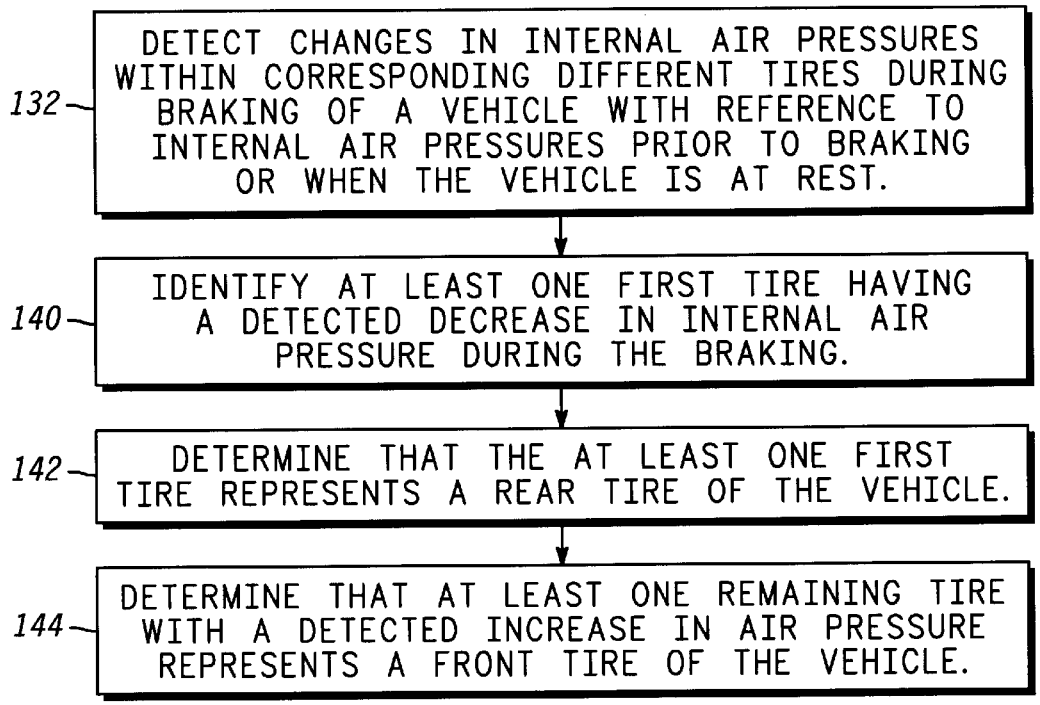

FIG. 11 and FIG. 12 are flow charts of the second technique for performing step 120 of FIG. 9. In step 132 of FIG. 11, pressure sensors 12, physical parameter sensors 14 or a combination thereof detect internal air pressures within corresponding different tires during braking of a vehicle. The braking of a vehicle may be defined as the vehicle meeting or exceeding a minimum deceleration level. The transmitter 18 of the wheel electronics assembly 10 transmits information representing the detected internal air pressures to the central electronics unit 22 consistent with FIG. 9. For example, the detected internal air pressure may be transmitted in step 115 of FIG. 9 and the detection of step 132 may occur prior to step 115 of FIG. 9.

In step 134, the processor 26 of the central electronics unit 22 identifies at least one first tire having a detected increase in internal air pressure during the braking. The detected increase in air pressure is measured with reference to an internal air pressure within the same tire when the vehicle is at rest or at another time prior to braking. For example, for a vehicle having four wheels, the processor 26 identifies two first tires having the two detected increases in internal air pressures among the tires of the vehicle. The two detected increases in internal air pressures may be equal or fall within a limited range of each other.

In step 136, the processor 26 determines that at least one first tire represents a front tire of the vehicle. For example, the processor 26 may determine that the two first tires having the detected increase in air pressures represent the front tires of the vehicle.

In step 138, the processor 26 determines that at least one remaining tire, with a detected decrease in air pressure, represents a rear tire of the vehicle. For example, for a vehicle having four wheels, the processor 26 identifies the two second tires having the two lowest detected decreases in internal air pressures as the rear tires of the vehicle. After step 138, the method may continue with step 122 of FIG. 9.

In step 132 of FIG. 12, pressure sensors 12, physical parameter sensors 14 or a combination thereof detect internal air pressures within corresponding different tires during braking of a vehicle. The braking of a vehicle may be defined as the vehicle meeting or exceeding a minimum deceleration level. The transmitter 18 of the wheel electronics assembly 10 transmits information representing the detected internal air pressures to the central electronics unit 22 consistent with FIG. 9. For example, the detected internal air pressure may be transmitted in step 115 of FIG. 9 and the detection of step 132 may occur prior to step 115 of FIG. 9.

In step 140, the processor 26 of the central electronics unit 22 identifies at least one first tire having a detected decrease in internal air pressure. The decrease in the internal air pressure of a tire is measured with reference to the internal air pressure of the same tire when the vehicle is at rest or prior to braking. For example, for a vehicle having four wheels, the processor 26 identifies two first tires having the two detected decreases in internal air pressures among the tires of the vehicle. The two detected decreases internal air pressures may be equal or fall within a limited range of each other.

In step 142, the processor 26 determines that at least one first tire represents a rear tire of the vehicle. For example, the processor 26 may determine that the two first tires having the detected decrease in air pressures represent the rear tires of a vehicle.

In step 144, the processor 26 determines that at least one remaining tire, with a detected increase in air pressure. For example, for a vehicle having four wheels, the processor 26 identifies the two remaining tires having the two detected increases in internal air pressures as the front tires of the vehicle. After step 144, the method may continue with step 122 of FIG. 9.

Figure 13:
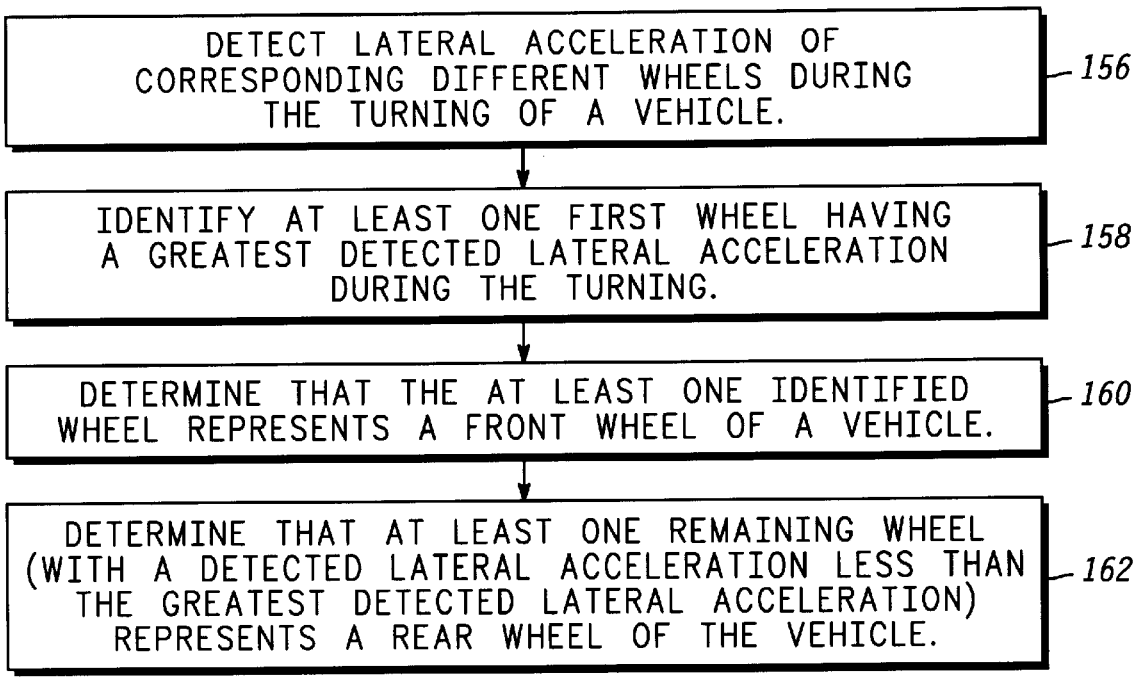
Figure 14:
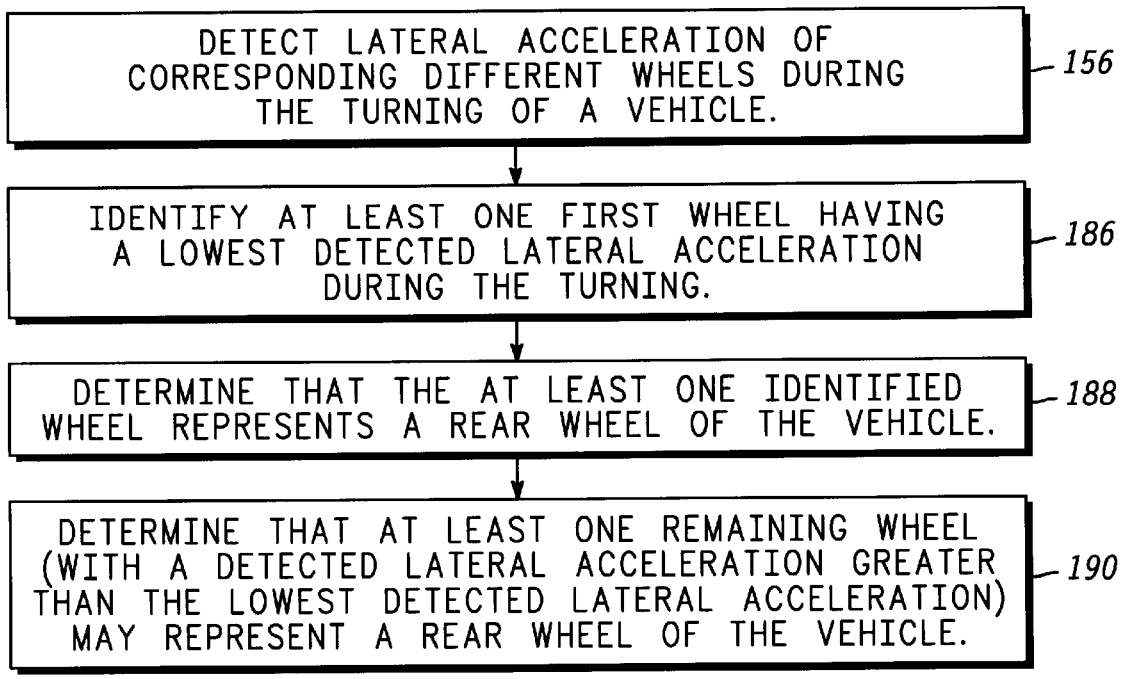

FIG. 13 and FIG. 14 are flow charts of a third technique for performing step 120 of FIG. 9. In step 156 of FIG. 13, physical parameter sensors 14 detect lateral acceleration of corresponding different wheels during the turning or cornering of a vehicle. The transmitter 18 of the wheel electronics assembly 10 transmits information representing the detected lateral acceleration to the central electronics unit 22 consistent with FIG. 9. For example, the detected lateral acceleration may be transmitted in step 115 of FIG. 9 and the detection of step 156 may occur prior to step 115 of FIG. 9.

In step 158, the processor 26 of the central electronics unit 22 identifies at least one first wheel having a greatest detected lateral acceleration during turning or cornering. For example, for a vehicle having four wheels, the central electronics unit 22 may identify two first wheels having the greatest detected lateral acceleration during turning.

In step 160, the processor 26 determines that the at least one identified first wheel represents a front wheel of a vehicle. For example, two first wheels having the greatest lateral acceleration during turning represent the front wheels of a vehicle.

In step 162, the processor 26 determines that at least one remaining tire, with a detected lateral acceleration less than the greatest detected lateral acceleration, may represent a rear tire of the vehicle. For example, for a four-wheeled vehicle, the detected lateral acceleration of the two lowest lateral accelerations is generally associated with the rear tires. After step 162, the method may continue with step 122 of FIG. 9.

In step 156 of FIG. 14, physical parameter sensors 14 detect lateral acceleration of corresponding different wheels during the turning or cornering of a vehicle. The transmitter of the wheel electronics assembly 10 transmits information representing the detected lateral acceleration to the central electronics unit 22 consistent with FIG. 9. For example, the detected lateral acceleration may be transmitted in step 115 of FIG. 9 and the detection of step 156 may occur prior to step 115 of FIG. 9.

In step 186, the processor 26 of the central electronics unit 22 identifies at least one first wheel having a lowest detected lateral acceleration during turning or cornering. For example, for a vehicle having four wheels, the central electronics unit 22 may identify two first wheels having the lowest detected lateral acceleration during turning.

In step 188, the processor 26 determines that the at least one identified first wheel represents a rear wheel of a vehicle. For example, two first wheels having the lowest lateral accelerations during turning represent the rear wheels of a vehicle.

In step 190, the processor 26 determines that at least one remaining wheel, with a detected lateral acceleration greater than the lowest detected lateral acceleration, may represent a front tire of the vehicle. For example, for a fourwheeled vehicle the detected lateral acceleration of the two highest lateral accelerations is generally associated with the front wheels of the vehicle. After step 190, the method may continue with step 122 of FIG. 9.

Figure 15:
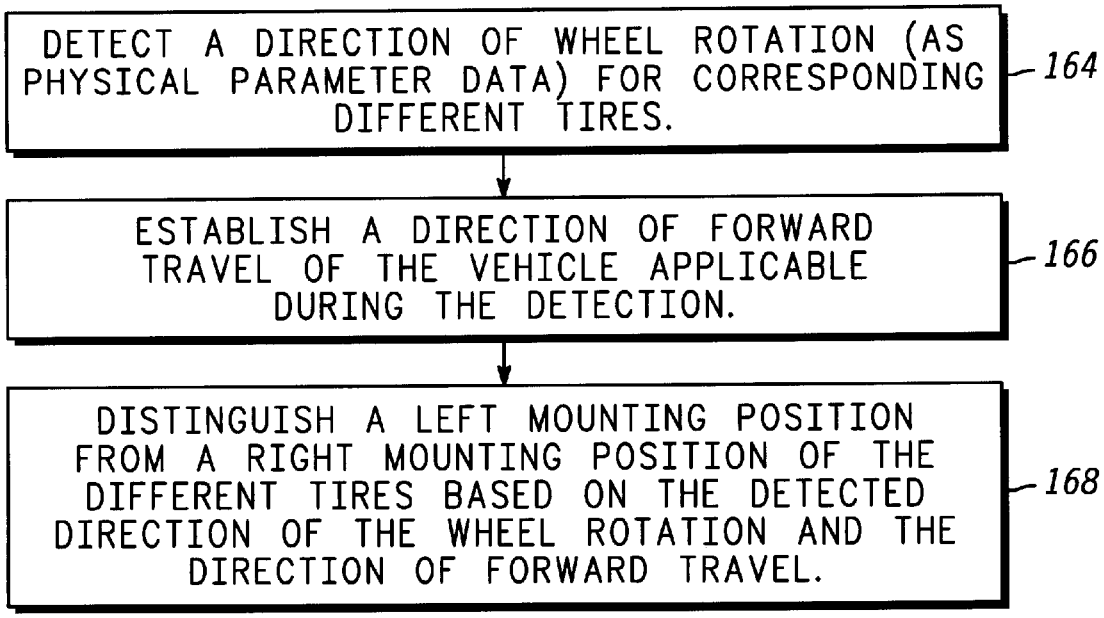
FIG. 15 through FIG. 18 are flow charts representing various procedures for distinguishing between a leftwire and a right tire of a vehicle in accordance with the invention.

FIG. 15 is a flow chart of a first procedure for executing step 122 of FIG. 9. In step 164, a physical parameter sensor 14 detects a direction of wheel rotation, as physical parameter data, for corresponding different tires. The transmitters 18 of the wheel electronics assemblies 10 transmit the information on the detected direction(s) of wheel rotation to the central electronics unit 22 consistent with the method of FIG. 9. For example, the transmitters 18 transmit the detected direction during step 115 and the detection occurs in step 164 prior to step 115.

In step 166, the processor 26 of the central electronics unit 22 establishes a direction of forward travel, which is applicable during the detection of step 164. The processor 26 may establish the direction of forward travel by receiving an input from a transmission-related output that indicates a gear selection (e.g., forward, reverse, first gear, etc.) of the vehicle. Alternately the processor may perform a statistical analysis of the physical parameter data to identify a predominate acceleration direction as a direction of forward travel.

In step 168, the processor 26 distinguishes a left mounting position from a right mounting position of the different tires based on the detected direction of the wheel rotation and the direction of forward travel. For example, a right-mounted tire rotates in a clockwise direction as viewed from a right side of a vehicle during forward travel. Conversely, a left-mounted tire rotates in a counter-clockwise direction as viewed from a left side of the vehicle. After step 168, the method may continue with step 124 of FIG. 9.

Figure 16:
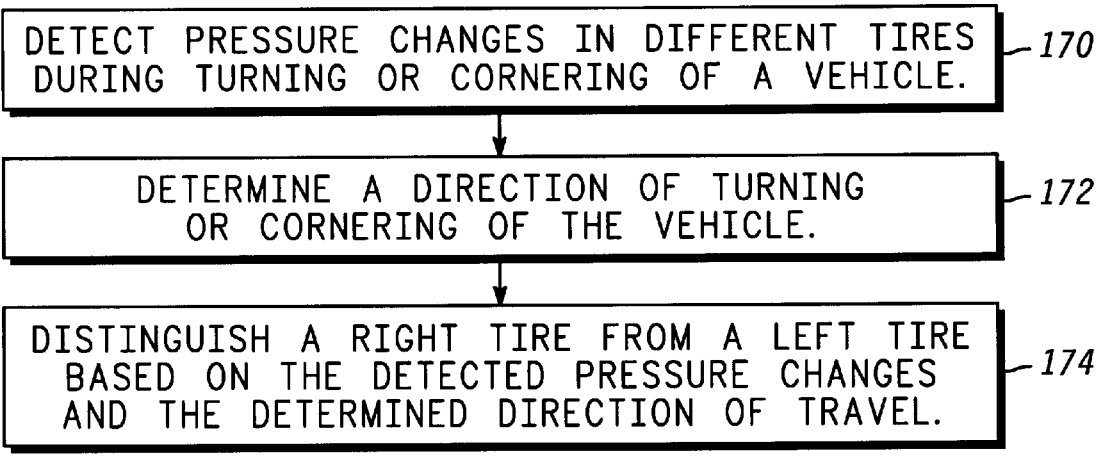

FIG. 16 is a flow chart of a second procedure for executing step 122 of FIG. 9. In step 170, pressure sensors 12, physical parameter sensors 14, or a combination thereof detect pressure changes in different tires during turning or cornering of a vehicle.

In step 172, physical parameter sensors 14, an additional sensor, an output from a turn signal, or an output from a steering system may provide a turn-direction signal to the processor 26 of the central electronics unit 22. The processor 26 determines the direction of the turning or cornering of the vehicle during the detection of step 170 based on the turn-direction signal. The transmitters 18 of the wheel electronics assemblies 10 may transmit the information on the detected pressure changes, the detected turning direction, or both to the central electronics unit 22 consistent with the method of FIG. 9. For example, the transmitters 18 may transmit the detected pressure changes during step 115 and the detection of the pressure changes in step 172 may occur prior to step 115.

In step 174, the processor 26 distinguishes a right tire from a left tire based on the detected pressure changes and the determined direction of travel. The pressure changes within the tires may be determined relative to the same tires when the vehicle is at rest or at another time prior to the turning of the vehicle. After step 174, the method continues with step 124.

Figure 17:
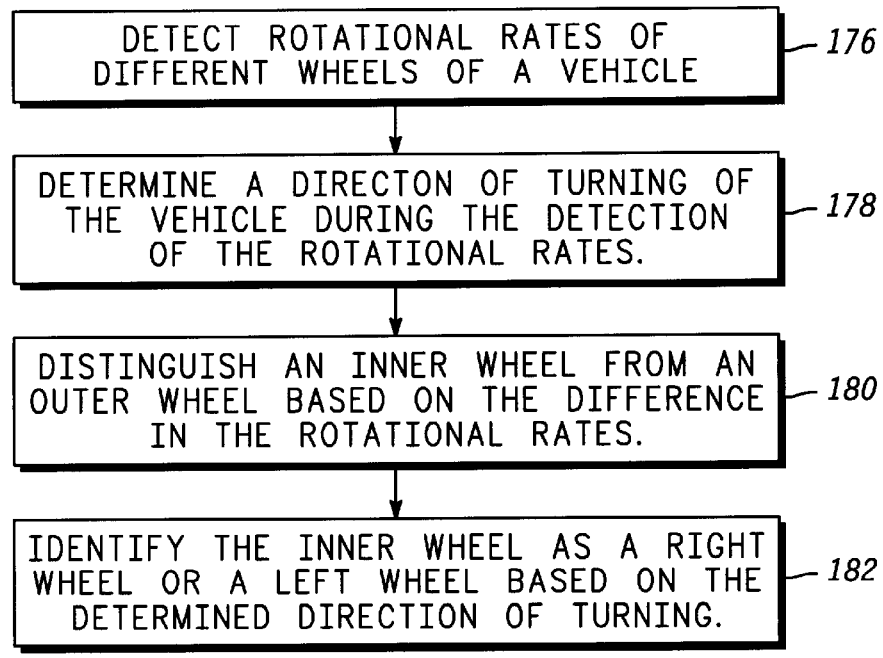
Figure 18:
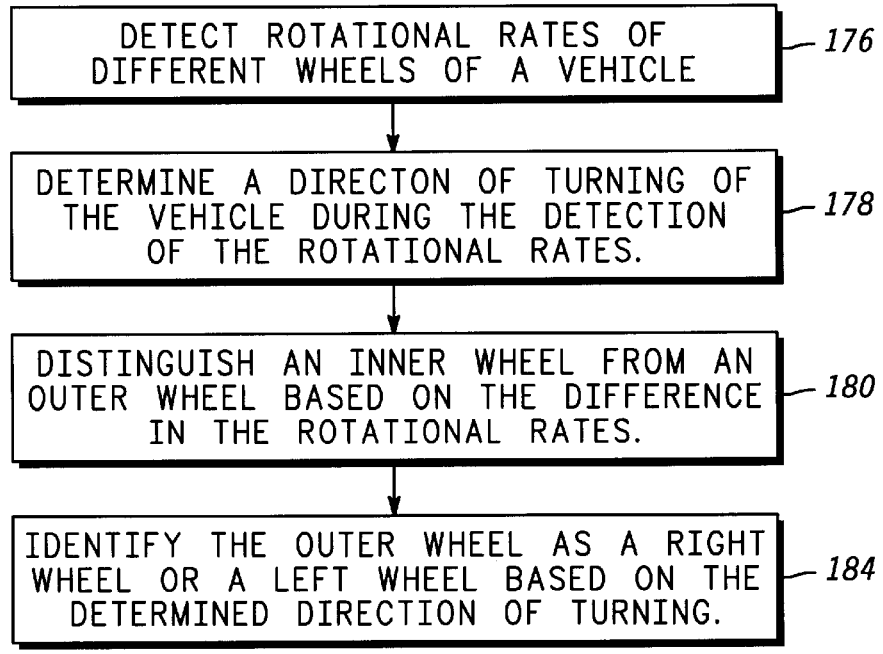

FIG. 17 and FIG. 18 are flow charts of the third procedure for executing step 122 of FIG. 9. Like numbers indicate like steps in FIG. 17 and FIG. 18. In step 176, a physical parameter sensor 14 detects rotational rates of different wheels of a vehicle. The transmitter 18 of the wheel electronics assembly 10 may transmit information on the detected rotational rates to the central electronics unit 22 consistent with step 115 of FIG. 9.

In step 178, physical parameter sensors 14, an additional sensor, an output from a turn signal, or an output from a steering system may provide a turn-direction signal to the processor 26 of the central electronics unit 22. The processor 26 determines the direction of the turning or cornering of the vehicle during the detection of the rotational rates in step 176 based on the turn-direction signal. The transmitters 18 of the wheel electronics assemblies 10 may transmit the information on the detected rotational rates of the wheels, the detected turning direction, or both to the central electronics unit 22 consistent with the method of FIG. 9. For example, the transmitters 18 may transmit the detected rotational rates of the wheels during step 115 and the detection of step 176 of the pressure changes may occur prior to step 115.

After step 178 in step 180, the processor 26 distinguishes an inner wheel from an outer wheel based on the difference in the detected rotational rates associated with corresponding wheels. During a turn, the outer wheel has a greater rotational rate than the inner wheel.

In step 182, the processor 26 identifies the inner wheel as a right wheel or a left wheel based on the determined direction of the turning. For example, if the vehicle turns to the left, the inner wheel is the left wheel. Conversely, if the vehicle turns the right, the inner wheel is the right wheel. After step 182, the method may continue with step 124 of FIG. 9.

FIG. 18 is similar to FIG. 17 except step 182 of FIG. 17 is replaced with step 184 of FIG. 18. In step 184, the processor 26 identifies the outer wheel as a right wheel or a left wheel based on the determined direction of turning. For example, if the vehicle turns to the left, the outer wheel is the right wheel. Conversely, if the vehicle turns to the right, the outer wheel is the left wheel. After step 184, the method may continue with step 124 of FIG. 9.

Figure 19:
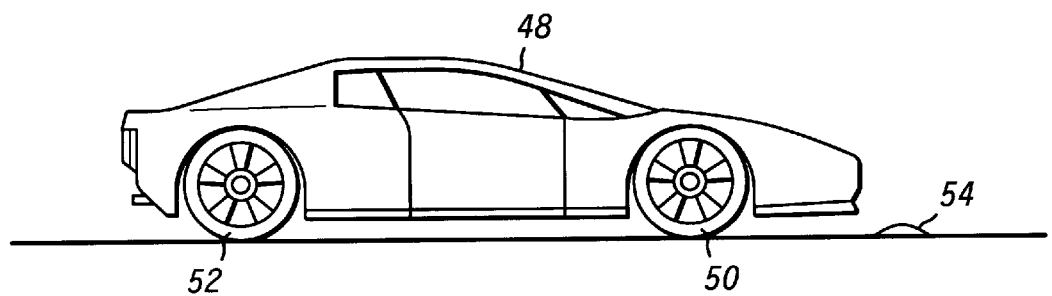
FIG. 19 and FIG. 20 are side views of a vehicle prior to transmitting pressure data or signals consistent with the method of FIG. 9.
Figure 20:
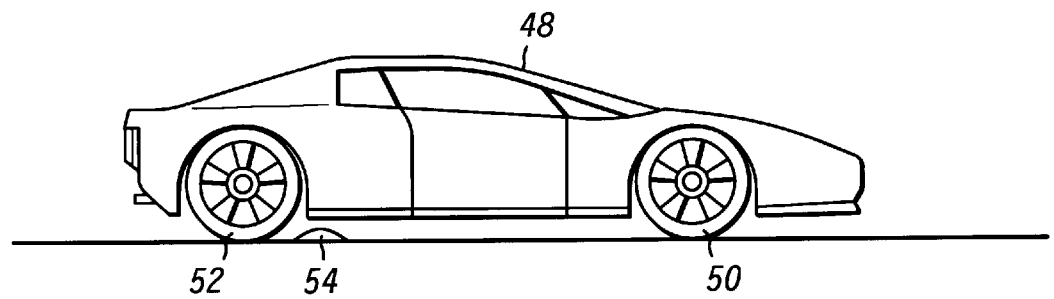

In FIG. 19 and FIG. 20, a vehicle 48 travels over a road feature 54 such as a bump in a direction of travel from right to left. FIG. 19 shows a vehicle 48 immediately before the front tire 50 traverses a road feature 54 (e.g., bump). FIG. 20 shows the vehicle 48 immediately before the rear tire 52 of the vehicle 48 traverses the road feature 54. As shown, the front tire 50 of the vehicle 48 travels over the bump prior to the rear tire 52 of the vehicle 48. The measurement sensor 12 senses the pressure in the front tire 50 and attains a pressure profile of average pressure for at least one front wheel and at least one rear wheel to facilitate differentiating a front tire 50 from a rear tire 52 as previously described.

Figure 21:
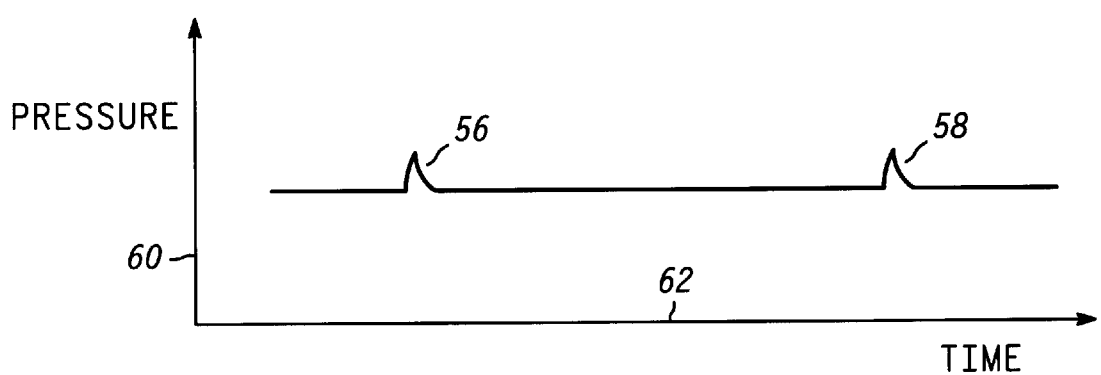
FIG. 21 is a graph illustrating a comparison of the received pressure signals for identifying at least one front tire and a rear tire consistent with the method of FIG. 9.

FIG. 21 shows a signal response of pressure signals for the front tire 50 and the rear tire 52 versus time. The horizontal axis 62 represents time and the vertical axis 60 represents pressure. The vertical axis 60 may also indicate the amplitude of the signal response where the pressure sensor provides an analog output signal.

As set forth in FIG. 21, the measurement sensor 12 may attain a measurement of the pressure peak 58 at the rear tire 52, which has a similar waveform to the pressure peak 56 at the front tire 50 for the same road feature (e.g., road feature 54). Accordingly, the central electronics unit 22 compares the pressure peak 56 of the front tire 50 measured at a prior time to the pressure peak 58 of a rear tire 52 measured at a subsequent time. The subsequent time is shortly after the prior time and consistent with the velocity of the vehicle 48 and the overall distance between the front tire 50 and the rear tire 52 in the direction of travel. The comparison determines if the pressure peak 56 associated with the front tire 50 is sufficiently similar to the pressure peak 58 associated with the rear tire 52 to indicate that the same road feature was first traversed by the front tire 50 and then by the rear tire 52. A pressure peak 56 of the front tire may be considered sufficiently similar to the pressure peak 58 of the rear tire, if the pressure peaks fall within a certain range of each other and exceed a minimum target threshold. Alternately, the pressure peak 56 of the front tire may be considered sufficiently similar or substantially similar to the pressure peak 58 of the rear tire, if a comparison of the waveform of the pressure peaks has a similar shape (e.g., slope and a maximum pressure peak.) If the pressure peak 56 associated with the front tire 50 and the pressure peak 58 associated with the rear tire 52 are substantially identical or similar (e.g., at least exceeding a target threshold), the processor 26 determines that the pressure peak that occurred first was present at the front tire 50 and the sufficiently similar or identical pressure peak that happened later was present at the rear tire 52.

Figure 22:
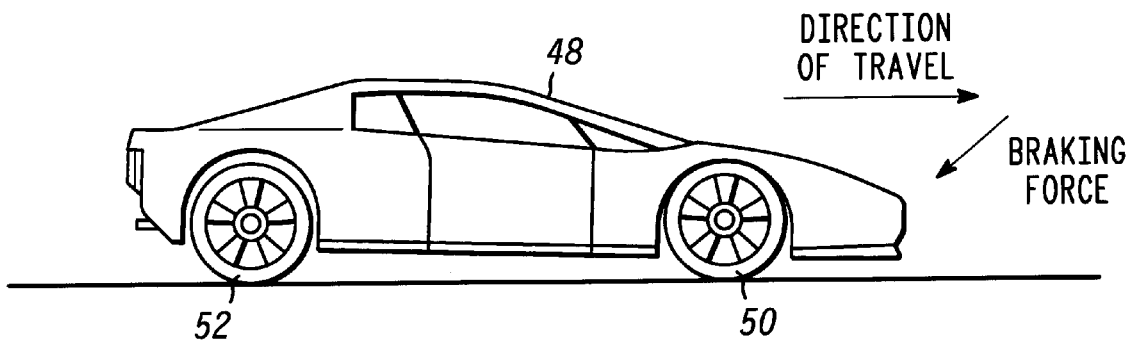
FIG. 22 is a side view of a vehicle and illustrates an alternative procedure in which a front tire and a rear tire are distinguished by a change in front air pressure of front tires during the application of a braking force to the vehicle in accordance with the invention.

FIG. 22 illustrates the pressure of the front tire 50 during braking where the direction of travel is from the left to the right. FIG. 22 exaggerates the deformation of the front tire 50 of the vehicle in response to the application of a braking force against the vehicle's movement in the direction of travel. FIG. 22 represents an alternative to identifying the front tire 50 by the similar pressure peaks associated with a front tire 50 and, subsequently, a rear tire 52 as shown in FIGS. 19–21. Instead, FIG. 22 shows the detection of the direction of travel when a braking force is detected and when the pressure detectors sense a pressure increase at the front tire 50, a pressure decrease at a rear tire 52, or both during application of the braking force.

Figure 23:
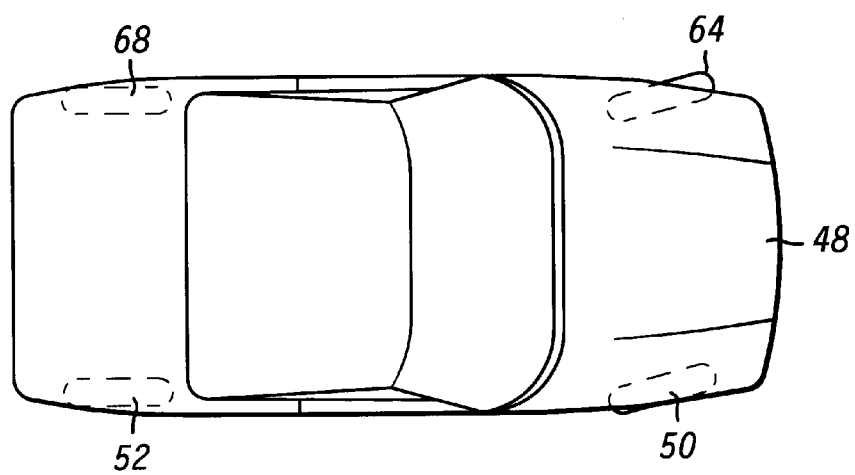
FIG. 23 is a top view of a vehicle and illustrates another alternative procedure in which one side of the vehicle is distinguished from another side by a differential air pressure existing between one tire chamber and an opposite tire chamber during a turning of the vehicle in accordance with the invention.

FIG. 23 illustrates the tires (50, 52, 64 and 68) of a vehicle 48 with four wheels when the vehicle 48 is turned to the left. Because a top view of the vehicle 48 is shown, portions of the tires (50, 52, 64 and 68) that are blocked from view by the body of the vehicle 48 are shown as dashed lines. In accordance with FIG. 23, the processor 26 may determine if a particular wheel is mounted on a left side of the vehicle or a right side of the vehicle. The processor 26 receives a measurement sensor data from the tires with corresponding code identifications. For example, as the vehicle travels to the left, the pressure sensors 12 sense that the tires on the left side of the vehicle have a decrease in tire pressure, the tires on the right side of the vehicle have an increase in pressure, or both as shown in FIG. 23. Accordingly, the processor 26 may use the differential pressure information along with an input of steering directions from a steering wheel system, or otherwise, to distinguish a left side of the vehicle from a right side of the vehicle for the mounting of tires.

Figure 24:
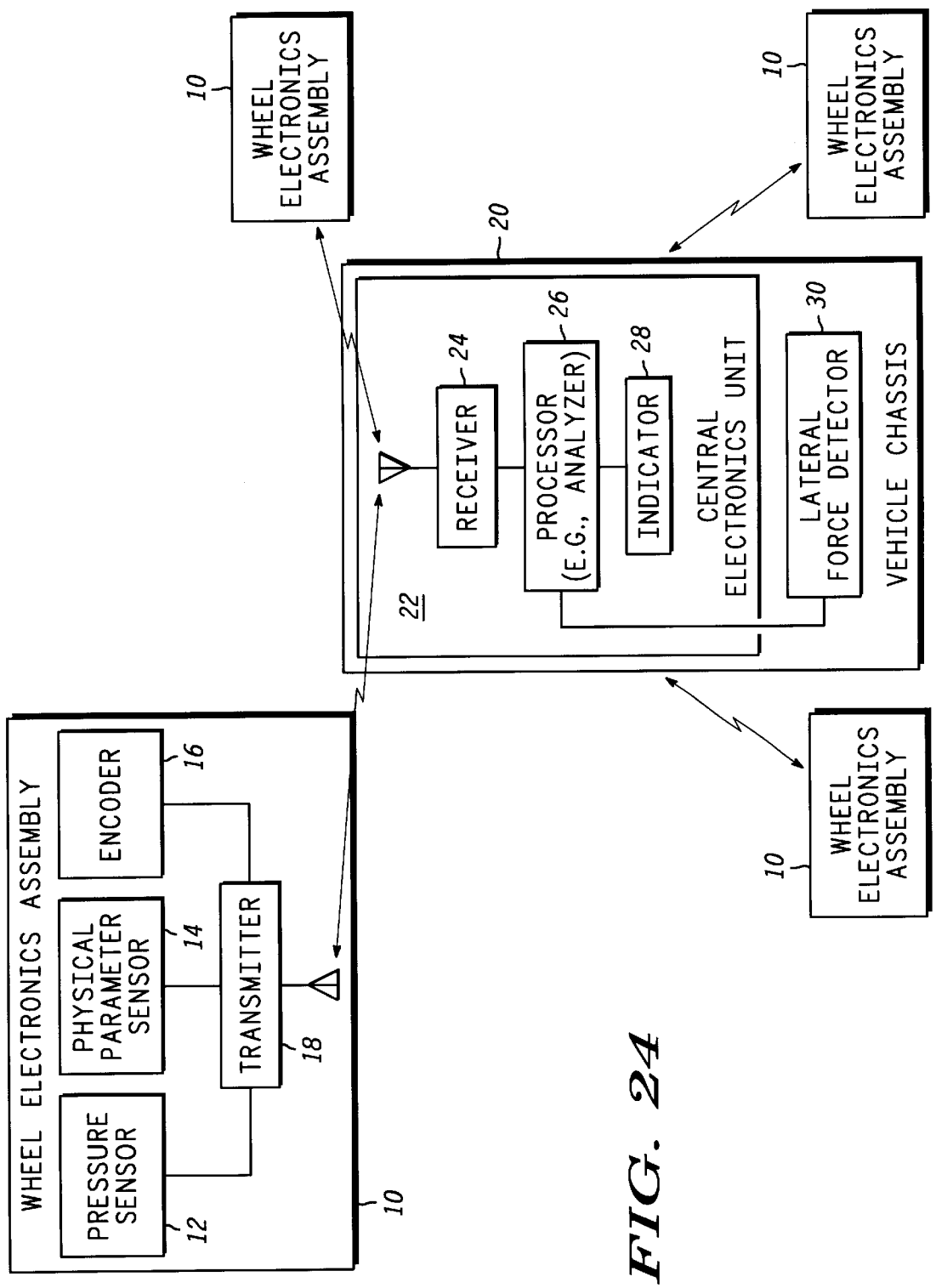
FIG. 24 is a block diagram of an alternate embodiment of the system for monitoring pressure of different tires in accordance with the invention.

FIG. 24 illustrates an alternative embodiment of the system for monitoring pressure of different tires in accordance with the invention. The system of FIG. 24 is similar to the system of FIG. 1, except FIG. 24 includes a lateral force detector 30 mounted on the vehicle chassis 20 for measuring a lateral force applied to the vehicle chassis 20. The lateral force may preferably be measured when the vehicle turns to distinguish a left tire from a right tire of the vehicle during the turning of the vehicle.

Figure 25:
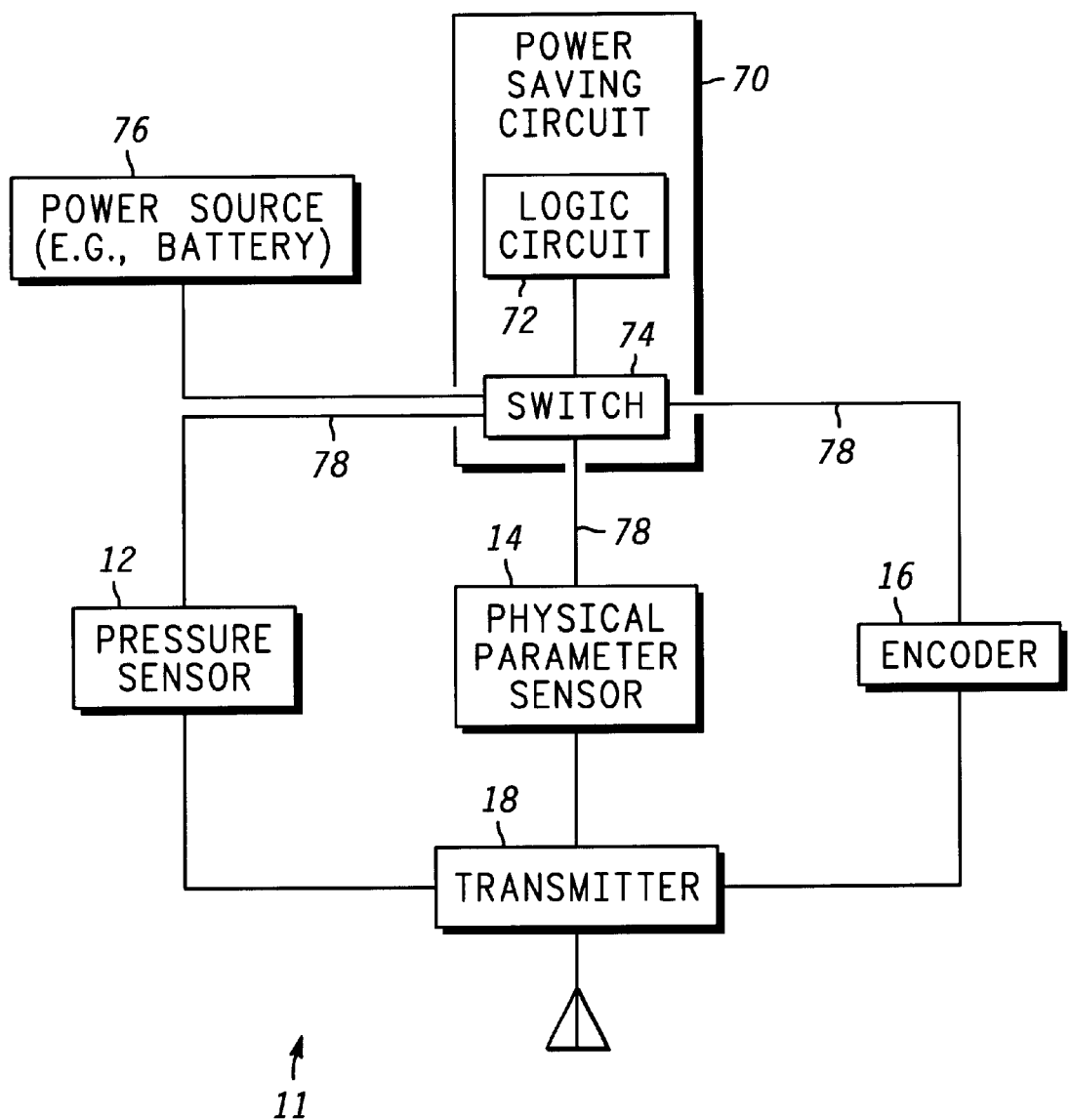
FIG. 25 is a block diagram of another alternate embodiment of the system for monitoring pressure of different tires in accordance with the invention.

FIG. 25 represents an alternative embodiment of the invention. FIG. 25 is similar to FIG. 1, except the wheel electronics assembly 11 of FIG. 25 is equipped with a power-saving circuit 70 to reduce the drain on the power source 76 and to increase the longevity of the power source 76. The power source 76 may comprise a battery, a generator, an alternator, the combination of a generator and a battery, or any device that converts rotational motion of a tire into electrical energy. The generator may have a rotor mounted on the wheel and a stator mounted on the body of the vehicle. The power source 76 may feed power to the other components of the wheel electronics assembly 11.

The power-saving circuit 70 is coupled to includes a power source 76. In turn, the power-saving circuit 70 may be coupled to the measurement sensor 12, the Xl; physical parameter sensor 14, and the encoder 16. The power-saving circuit 70 preferably includes a logic circuit 72 and a switch 74. The logic circuit 72 may determine the state of the switch 74. In a first state, the switch 74 only applies power to the physical parameter sensor 14 and the transmitter 18. In a second state, the switch 74 applies power from the power source 76 to two or more of the following components: the measurement sensor 12, the physical parameter sensor 14, the transmitter 18, and the encoder 16. The physical parameter sensor 14 may provide an inertial data signal or an acceleration data signal which indicates movement of the vehicle. Upon movement of the vehicle 48 after starting the engine, the switch may be changed from the first state to the second state by the logic circuit 72. Accordingly, power is not drained from the power source 76 such as a battery while the vehicle is stationary or at rest.

In an alternative embodiment, the power-saving circuit 70 may be controlled by a timer rather than sensing movement of the car in accordance with the physical parameter sensor 14 such that the measurement sensor 12, the physical parameter sensor 14 and the encoder 16 are periodically or regularly turned on while the vehicle is moving to conserve battery power.

Although the invention determines the relative mounting position of the tires on a vehicle by using physical parameter signals, in an alternate configuration, a distinctive tag or mark may be placed on a visible part of the wheel or vehicle. A visible part of the vehicle may include a wheel, a tire, a valve core, a rim, or the like. Because the visible part of the vehicle may require an operator to leave the cockpit for viewing or inspecting the visible part, the distinctive tag may supplement or complement the indicator provided in the cockpit as previously described herein. The distinctive tag is associated with a corresponding identification code of a transmitter 18 affiliated with the wheel. For example, the distinctive tag may comprise a patch of color, a letter, a number, or a unique symbol to facilitate identification of the wheel with a flat or deflated tire. The indicator 28 inside the vehicle could warn the vehicle operator that a tire labeled with a particular distinctive tag (e.g., a green adhesive label) has low pressure.

The foregoing description of the method and the system for monitoring air pressure merely provides several illustrative embodiments of the invention. Modifications, alternative arrangements, and variations of these illustrative embodiments are possible and may fall within the scope of the invention. Accordingly, the following claims should be accorded the reasonably broadest interpretation which is consistent with the specification disclosed herein and not unduly limited by aspects of the preferred embodiments disclosed herein.

The following is claimed:

1. A method for monitoring air pressure of at least one tire of a vehicle, the method comprising the steps of:
    receiving pressure data associated with at least one particular tire among different tires of the vehicle;
    obtaining physical parameter data indicating physical parameter measurements associated with the different tires of a vehicle; and
    evaluating the obtained physical parameter data to identify a relative mounting position of the particular tire.

2. The method according to claim 1 wherein the evaluating step comprises comparing a first signal response representing physical parameter data associated with a first tire to a second signal response representing physical parameter data associated with the second tire to determine the relative mounting positions of the first tire and the second tire.

3. The method according to claim 1 wherein the obtaining step comprises receiving inertial signals corresponding to different tires, wherein the physical parameter measurements comprise inertial force measurements.

4. The method according to claim 1 wherein the receiving step comprises receiving a first signal response associated with a corresponding first tire pressure and receiving a second signal response associated with a corresponding second tire pressure, the first signal response and the second signal response being expressed as the pressure data.

5. The method according to claim 4 wherein the evaluating step comprises comparing the first pressure signal response to the second signal response to distinguish a front tire from a rear tire on the vehicle.

6. The method according to claim 1 further comprising the step of:
    indicating a status of an internal air pressure and the identified mounting position of the particular tire to a vehicle operator.

7. The method according to claim 6 wherein the indicating step comprises indicating the particular tire is partially deflated, with respect to a desired target air pressure, as the status.

8. The method according to claim 6 wherein the indicating step comprises indicating the particular tire is flat as the status.

9. A method for monitoring an operational status of at least one tire of a vehicle, the method comprising the steps of:
    receiving measurement data from measurement sensors associated with different tires of a vehicle,
    receiving physical data from physical sensors associated with the vehicle;
    comparing one of the measurement data and the physical parameter data for different tires to identify at least a front tire and a rear tire among the different tires;
    comparing one of the measurement data and the physical parameter data to distinguish a tire mounted on one side of a vehicle from a tire mounted on an opposite side of a vehicle; and identifying a mounting position of at least one defective or deflated tire among the different tires by the comparison of the measurement data and by the comparison of the physical parameter data.

10. The method according to claim 9 wherein comparing the measurement data comprises distinguishing the front tire from the rear tire of the vehicle by determining if a first signal response, representing the detection a road feature at a first tire, is sufficiently equivalent to a second signal response, representing the detection of the road feature at the second tire, the measurement data comprising pressure data.

11. The method according to claim 10 wherein the road feature comprises a bump.

12. The method according to claim 9 wherein the comparing the measurement data comprises distinguishing the front tire from the rear tire of the vehicle by determining if a first signal response, representing the detection a road feature at a first tire, is sufficiently equivalent to a second signal response, representing the detection of the road feature at the second tire, and if the second signal response was detected within a maximum predetermined time span after the first signal response was detected.

13. The method according to claim 9 further comprising the steps of:
measuring air pressures, as the measurement data, in the different tires of the vehicle during braking of the vehicle and prior to the braking of the vehicle.

14. The method according to claim 13 wherein the comparison of the measurement data comprises:
identifying at least one tire, associated with an increase in measured air pressure during the braking, as a front tire of the vehicle.

15. The method according to claim 13 wherein the comparison of the measurement data comprises:
identifying at least one tire, associated with a decrease in measured air pressure during the braking, as a rear tire of the vehicle.

16. The method according to claim 9 further comprising the step of measuring lateral acceleration, as the physical parameter data, of corresponding wheels of the vehicle.

17. The method according to claim 16 wherein the comparison of the physical parameter data comprises determining that the at least one wheel having the greatest lateral acceleration represents a front wheel of the vehicle.

18. The method according to claim 16 wherein the comparison of the measurement data comprises determining that the at least one wheel having the lowest lateral acceleration represents a rear wheel of the vehicle.

19. The method according to claim 9 further comprising transmitting signal parameter data as few as once per trip of the vehicle per each mounted wheel to facilitate electrical power conservation.

20. The method according to claim 9 further comprising the steps of:
detecting a direction of wheel rotation, as the physical parameter data, for the different tires; and
establishing a direction of forward travel of the vehicle applicable during the detection.

21. The method according to claim 20 wherein the comparison of the physical parameter data comprises the step of:
distinguishing a left mounting position from a right mounting position of the different tires based on the detected direction of the wheel rotation and the determined direction of the forward travel.

22. The method according to claim 9 further comprising the steps of:

detecting pressure changes, as the physical parameter data, in different tires during turning or cornering of the vehicle; and
determining a direction of the turning of a vehicle applicable during the turning or cornering.

23. The method according to claim 22 wherein the comparison of the physical parameter data comprises distinguishing the right tire from the left tire based on the detected pressure changes and the determined direction of the turning.

24. The method according to claim 9 further comprising:
detecting a rotational rate of different wheels on the vehicle; and
identifying a direction of turning of the vehicle.

25. The method according to claim 24 wherein the comparison step identifies an outer wheel as a wheel having a greatest rotational rate detected during the turning.

26. The method according to claim 24 wherein the comparison step identifies an inner wheel as the wheel having a lowest rotational rate detected during the turning.

27. The method according to claim 9 further comprising inhibiting the transmission of data from a first wheel electronics assembly at one front tire during the transmission of data from a second wheel electronics assembly at a second front tire, the inhibiting being invoked by monitoring detection of at least one road feature.

28. The method according to claim 9 further comprising inhibiting the transmission of a pressure signal from a first wheel electronics assembly at one rear tire during the transmission of a pressure signal from a second wheel electronics assembly at a second rear tire, the inhibiting being invoked by monitoring detection of at least one road feature.

29. The method according to claim 9 further comprising statistically analyzing one of inertial signals, rotational signals, and angular acceleration signals as the physical parameter data to distinguish between the braking during forward movement of the vehicle and braking during backward movement of the vehicle.

30. The method according to claim 9 wherein the mounting positions is selected from the group consisting of front right, front left, rear right, and rear left of a vehicle having four wheels.

31. A system for monitoring an operational status of different tires of a vehicle, the system comprising:
a measurement sensor for providing measurement data indicative of the status of a particular tire;
a plurality of physical parameter sensors for providing physical parameter data associated with respective physical parameters at corresponding different tires;
a plurality of transmitters coupled to the measurement sensor and the physical parameter sensors for transmitting an electromagnetic signal representative of the physical parameter data and the measurement data;
a receiver for receiving the electromagnetic signal and obtaining the physical parameter data and the measurement data; and
a processor for evaluating the obtained physical parameter data to identify a relative mounting position of the particular tire on the vehicle.

32. The system according to claim 31 further comprising an indicator, coupled to the processor, indicating the status of an internal air pressure and the identified mounting position of the particular tire to a user.

33. The system according to claim 31 wherein the physical parameter comprises inertia.

34. The system according to claim 31 wherein the processor is adapted to perform a statistical analysis of an amplitude versus time response of the measurement data.

35. The system according to claim 31 wherein the processor comprises an analyzer for comparing a first signal response indicative of air pressure in one tire to a second signal response indicative of air pressure in another tire.

36. The according to claim 31 wherein the measurement sensors further provide an activation signal for feeding electrical energy to at least one of the transmitters and the measurement sensors.

37. The system according to claim 31 wherein a distinctive tag is associated with a respective one of the transmitters, the distinctive tag being placed on a visible part of a wheel of the vehicle.

38. The system according to claim 31 wherein at least one of the physical parameter sensors comprises:

a round dielectric housing;

a conductive member enclosed in the round housing and being rotatable with respect to the housing in response to rotation of a particular one of the tires;

at least three conductive contacts disposed in an interior of the round housing; and a series of successive electrical contact closures between pairs of the three conductive contacts indicating a direction of rotation of the particular tire.

39. The system according to claim 31 wherein the physical parameter sensor is mounted on a wheel and comprises:

a mass predominantly responsive to gravitational force at lower rotational speeds of the wheel and predominantly responsive to centrifugal force at higher rotational speeds of the wheel;

a conductive movable arm connected to the mass; and a contact spaced apart from the conductive movable arm in an open state and electrically contacting the conductive movable arm in a closed state, such that a rotational rate of the wheel is indicated at the lower rotational speed of the vehicle by an oscillatory electrical connection between the contact and the conductive movable arm.

40. The system according to claim 39 wherein the open state is present at the higher rotational speeds of the wheel and the oscillatory electrical connection is absent at the higher rotational speeds of the wheel.

* * * * *